United States Patent
Poghosyan et al.

(10) Patent No.: US 10,713,265 B2
(45) Date of Patent: Jul. 14, 2020

(54) METHODS AND SYSTEMS TO QUANTIZE AND COMPRESS TIME SERIES DATA

(71) Applicant: VMware, Inc., Palo Alto, CA (US)

(72) Inventors: Arnak Poghosyan, Yerevan (AM); Ashot Nshan Harutyunyan, Yerevan (AM); Naira Movses Grigoryan, Yerevan (AM)

(73) Assignee: VMware, Inc., Palo Alto, CA (US)

( * ) Notice: Subject to any disclaimer, the term of this patent is extended or adjusted under 35 U.S.C. 154(b) by 199 days.

(21) Appl. No.: 15/627,925

(22) Filed: Jun. 20, 2017

(65) Prior Publication Data

US 2018/0365301 A1    Dec. 20, 2018

(51) Int. Cl.
*G06F 16/00* (2019.01)
*G06F 16/2458* (2019.01)
*G06F 12/08* (2016.01)

(52) U.S. Cl.
CPC .......... *G06F 16/2477* (2019.01); *G06F 12/08* (2013.01)

(58) Field of Classification Search
CPC ...................................................... G06F 16/00
See application file for complete search history.

(56) References Cited

U.S. PATENT DOCUMENTS

| | | | | |
|---|---|---|---|---|
| 2002/0064188 A1* | 5/2002 | Mizobata | ............. | H04N 21/426 370/535 |
| 2006/0265192 A1* | 11/2006 | Turicchi, Jr. | ........ | G06F 11/3409 702/187 |
| 2017/0161340 A1* | 6/2017 | Dannecker | ............ | G06F 16/248 |
| 2018/0107925 A1* | 4/2018 | Choi | ....................... | G06F 17/16 |

* cited by examiner

*Primary Examiner* — Khanh B Pham

(57) ABSTRACT

Methods and systems quantize and compress time series data generated by a resource of a distributed computing system. The time series data is partitioned according to a set of quantiles. Quantized time series data is generated from the time series data and the quantiles. The quantized time series data is compressed by deleting sequential duplicate quantized data points from the quantized time series data to obtain compress time series data. Quantization and compression are performed for different combinations of quantiles. The user may choose to minimize information loss of information due to quantization while selecting a lower bound for the compression rate. Alternatively, the user may choose to maximize the compression rate while placing an upper limit on the loss of information due to quantization. The compressed time series data that satisfies the user selected optimization conditions may be used to replace the original time series data in the data-storage device.

27 Claims, 36 Drawing Sheets

METHODS AND SYSTEMS TO QUANTIZE AND COMPRESS TIME SERIES DATA

TECHNICAL FIELD

The present disclosure is directed to quantizing and compressing time series data.

BACKGROUND

Electronic computing has evolved from primitive, vacuum-tube-based computer systems, initially developed during the 1940s, to modern electronic computing systems in which large numbers of multi-processor computer systems, such as server computers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems are made possible by advances in computer networking, distributed operating systems and applications, data-storage appliances, computer hardware, and software technologies.

In order to proactively manage a distributed computing system, system administrators are interested in detecting anomalous behavior and identifying problems in the operation of the disturbed computing system. Management tools have been developed to collect time series data from various virtual and physical resources of the distributed computing system and processes the time series data to detect anomalously behaving resources and identify problems in the distributed computing system. However, each set of time series data is extremely large and recording many different sets of time series data over time significantly increases the demand for data storage, which increases data storage costs. Large sets of time series data also slow the performance of the management tool by pushing the limits of memory, CPU usage, and input/output resources of the management tool. As a result, detection of anomalies and identification of problems are delayed. System administrators seek methods and systems to more efficiently and effectively store and process large sets of time series data.

SUMMARY

The disclosure is directed to automated methods and systems to quantize and compress time series data generated by objects of a distributed computing system. Examples of resources include virtual and physical resources, such as virtual and physical CPU, memory, data storage, and network traffic. The types of time series data include CPU usage, memory, data storage, and network traffic of a virtual or a physical resource. The time series data may be stored in a data-storage device, such as a mass-storage array, of a physical data center. The time series data is partitioned according to a set of quantiles. Quantized time series data is generated from the time series data and the quantiles, which may create a loss of information contained in the originally recorded time series data. The quantized time series data is compressed by deleting portions of the sequential duplicate quantized data points from the quantized time series data to obtain compress time series data. Quantization and compression are performed for different combinations of quantiles and subjected to a user selected limitation on loss of information or limitation on a compression rate. The user may choose to minimize information loss resulting from quantization while selecting a lower bound for the compression rate. Alternatively, the user may choose to maximize the compression rate while placing an upper limit on the loss of information due to quantization. The compressed time series data that satisfies the user selected optimization conditions may be used to replace the original time series data in the data-storage device. The compressed time series data occupies far less storage space than the original time series data, freeing storage space in the data-storage device. The smaller data set of compressed time series data also enables faster and more timely analysis by a management server.

DETAILED DESCRIPTION

Figure 1:
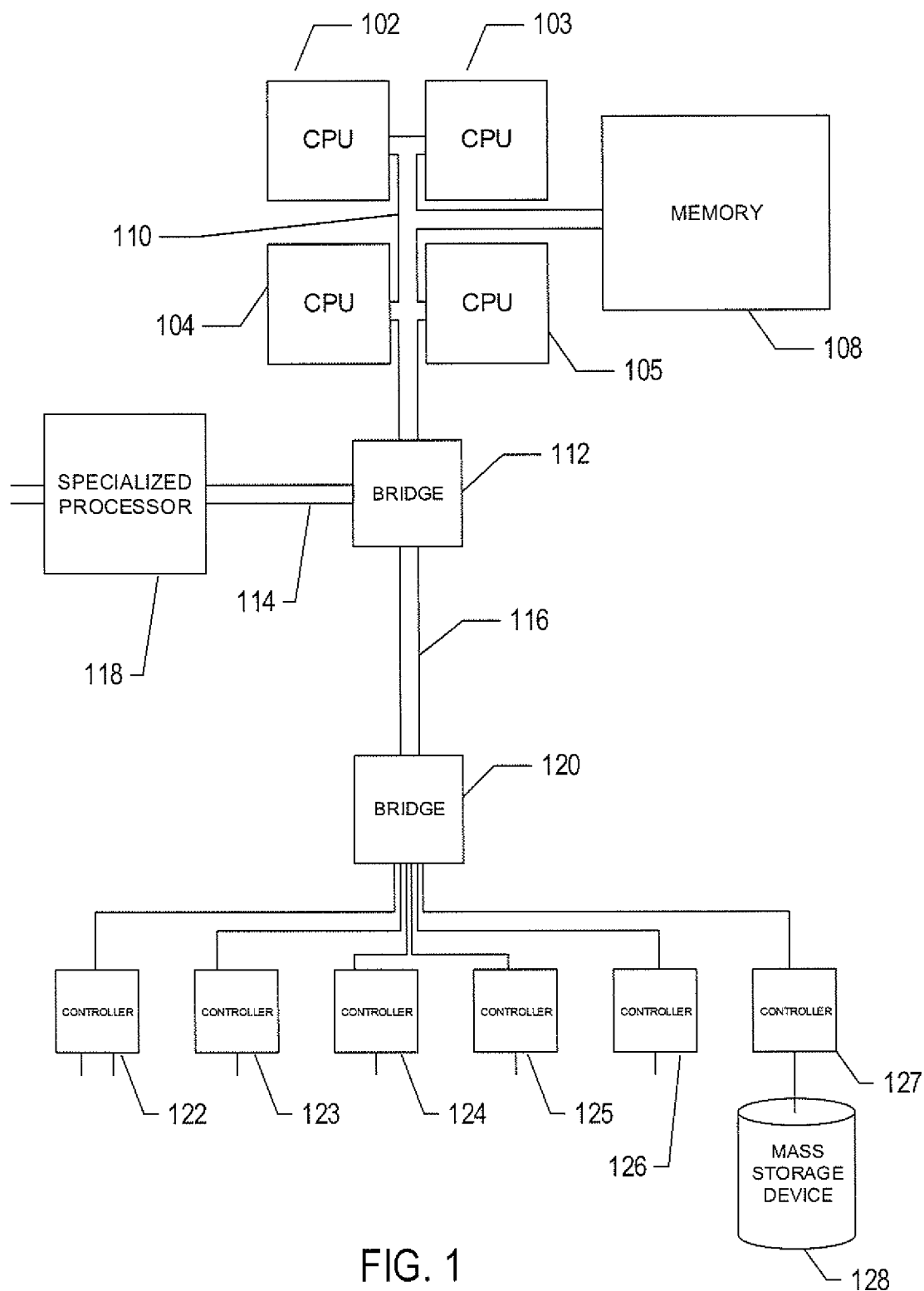
FIG. 1 shows a general architectural diagram for various types of computers.

This disclosure presents computational methods and systems to quantize and compress time series data. In a first subsection, computer hardware, complex computational systems, and virtualization are described. Containers and containers supported by virtualization layers are described in a second subsection. Methods to quantize and compress time series data are described below in a third subsection.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 shows a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational devices. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
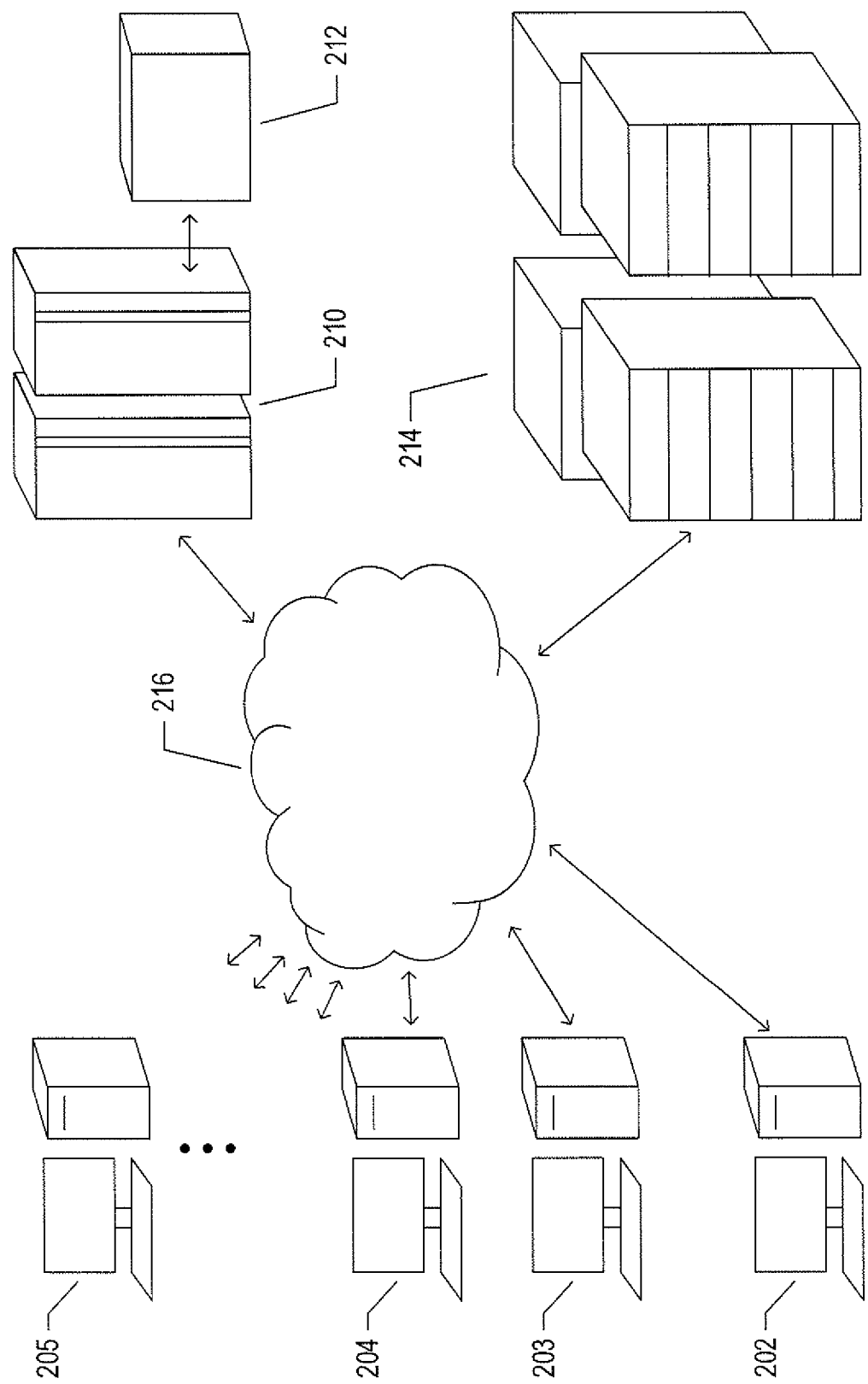
FIG. 2 shows an Internet-connected distributed computer system.

FIG. 2 shows an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
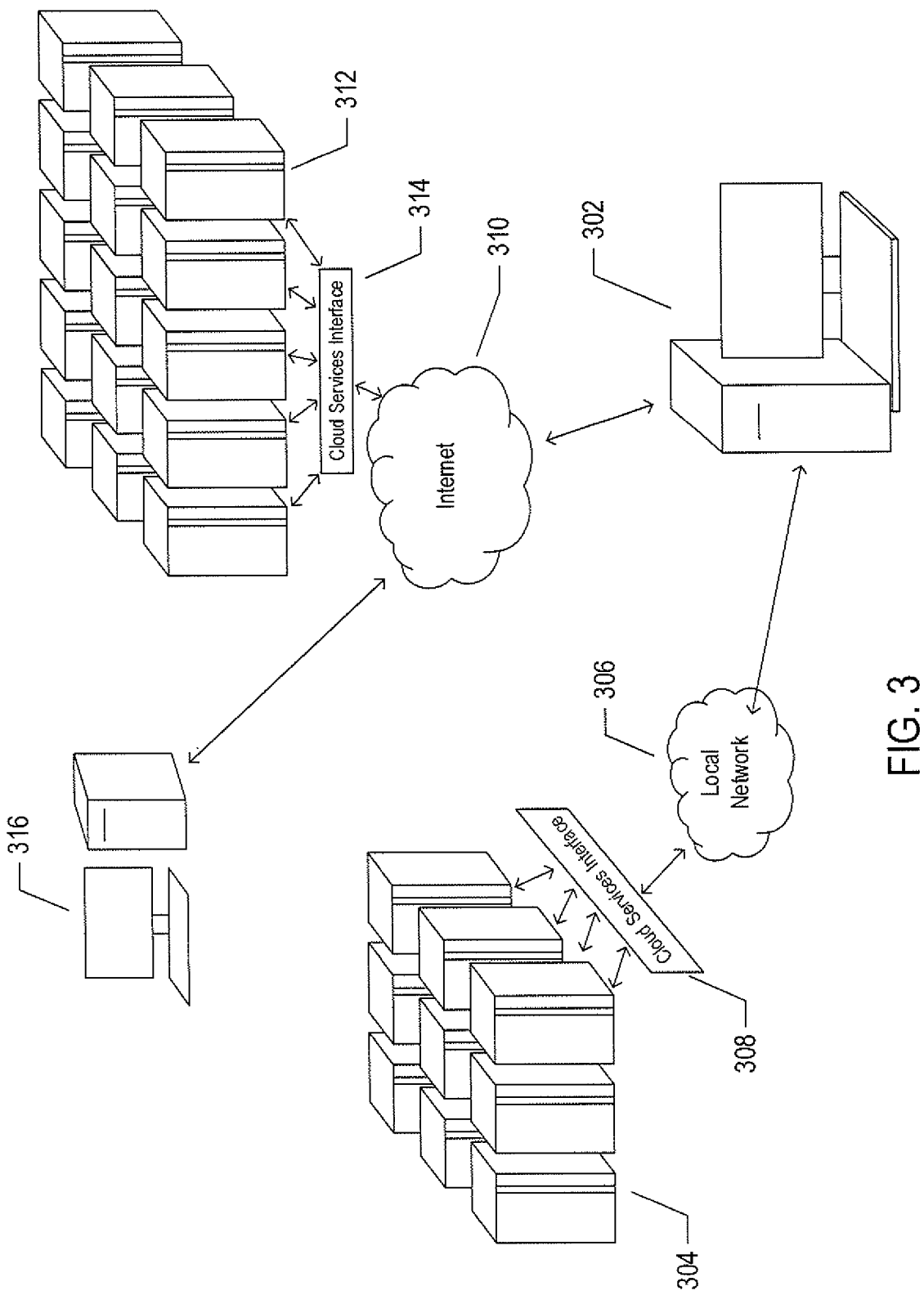
FIG. 3 shows cloud computing.

FIG. 3 shows cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the devices to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
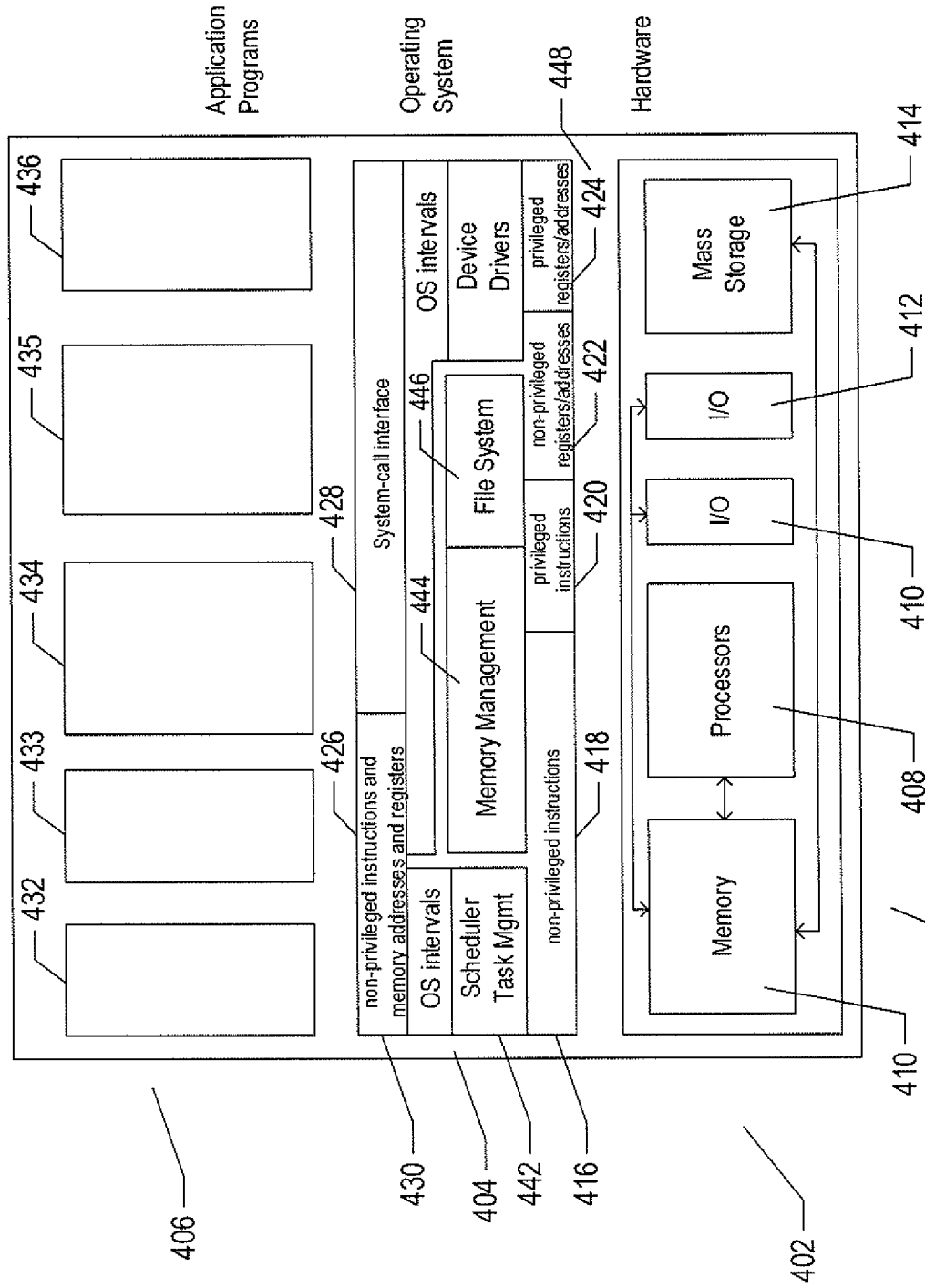
FIG. 4 shows generalized hardware and software components of a general-purpose computer system.

FIG. 4 shows generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory devices as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
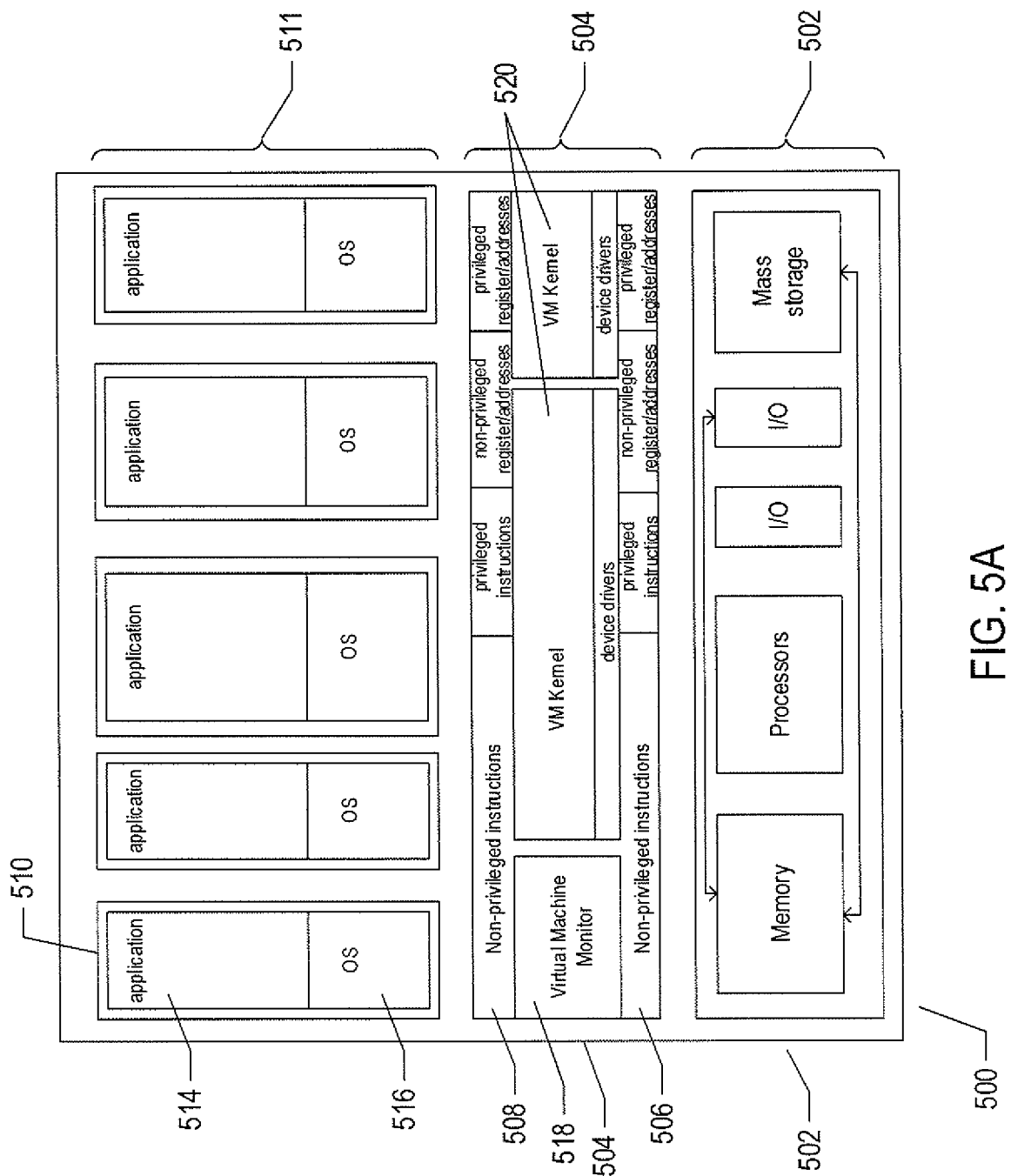
FIGS. 5A-5B show two types of virtual machine ("VM") and VM execution environments.
Figure 5B:
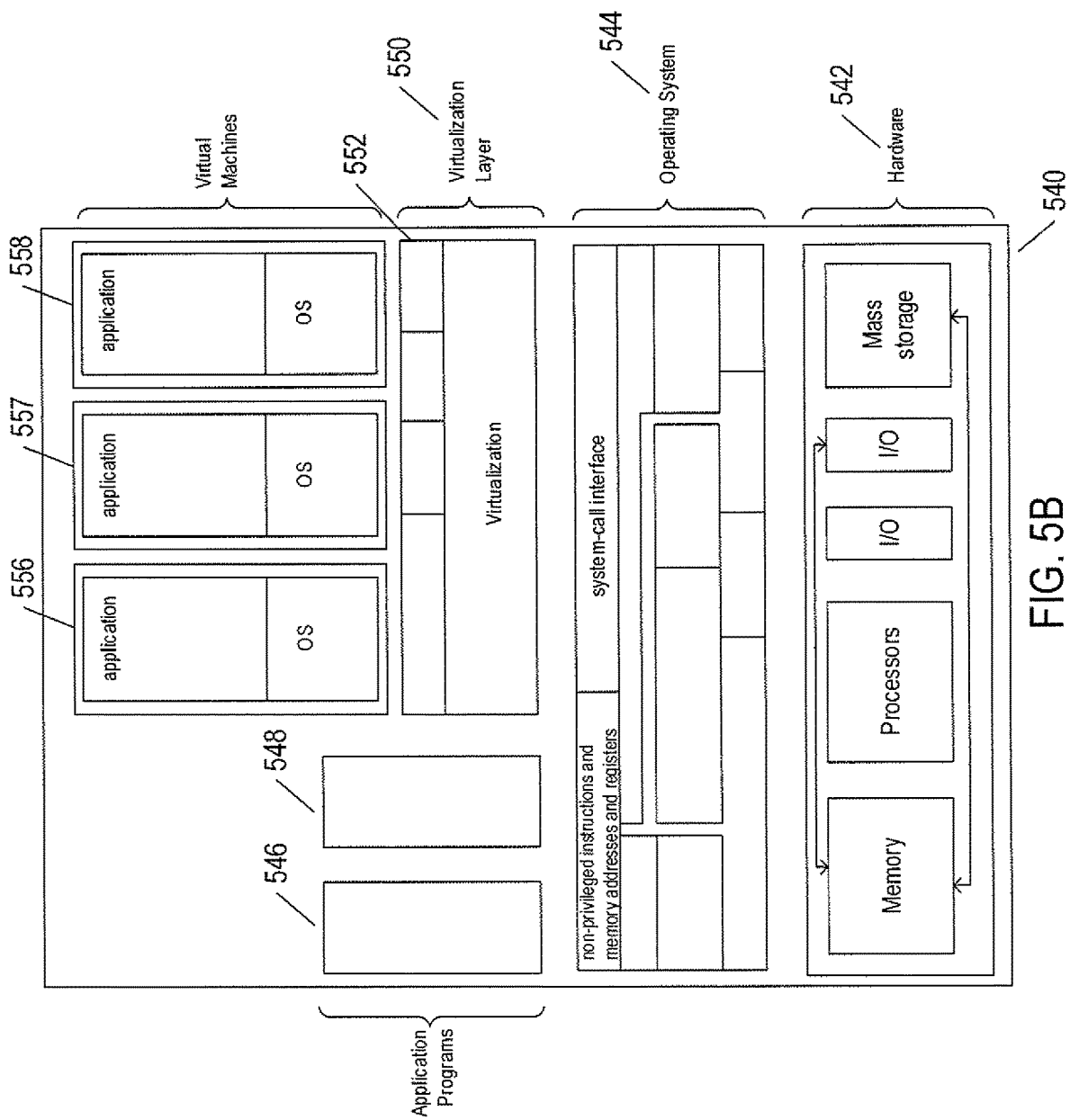

For all of these reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 5A-B show two types of VM and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment shown in FIG. 5A features a virtualization layer 504 that interfaces through a virtualization-layer/hardware-layer interface 506, equivalent to interface 416 in FIG. 4, to the hardware. The virtualization layer 504 provides a hardware-like interface 508 to a number of VMs, such as VM 510, in a virtual-machine layer 511 executing above the virtualization layer 504. Each VM includes one or more application programs or other higher-level computational entities packaged together with an operating system, referred to as a "guest operating system," such as application 514 and guest operating system 516 packaged together within VM 510. Each VM is thus equivalent to the operating-system layer 404 and application-program layer 406 in the general-purpose computer system shown in FIG. 4. Each guest operating system within a VM interfaces to the virtualization-layer interface 508 rather than to the actual hardware interface 506. The virtualization layer 504 partitions hardware devices into abstract virtual-hardware layers to which each guest operating system within a VM interfaces. The guest operating systems within the VMs, in general, are unaware of the virtualization layer and operate as if they were directly accessing a true hardware interface. The virtualization layer 504 ensures that each of the VMs currently executing within the virtual environment receive a fair allocation of underlying hardware devices and that all VMs receive sufficient devices to progress in execution. The virtualization-layer interface 508 may differ for different guest operating systems. For example, the virtualization layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtualization layer 504 includes a virtual-machine-monitor module 518 ("VMM") that virtualizes physical processors in the hardware layer to create virtual processors on which each of the VMs executes. For execution efficiency, the virtualization layer attempts to allow VMs to directly execute non-privileged instructions and to directly access non-privileged registers and memory. However, when the guest operating system within a VM accesses virtual privileged instructions, virtual privileged registers, and virtual privileged memory through the virtualization-layer interface 508, the accesses result in execution of virtualization-layer code to simulate or emulate the privileged devices. The virtualization layer additionally includes a kernel module 520 that manages memory, communications, and data-storage machine devices on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer 504 essentially schedules execution of VMs much like an operating system schedules execution of application programs, so that the VMs each execute within a complete and fully functional virtual hardware layer.

FIG. 5B shows a second type of virtualization. In FIG. 5B, the computer system 540 includes the same hardware layer 542 and operating system layer 544 as the hardware layer 402 and the operating system layer 404 shown in FIG. 4. Several application programs 546 and 548 are shown running in the execution environment provided by the operating system 544. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of VMs 556-558, each including one or more application programs or other higher-level computational entities packaged together with a guest operating system.

In FIGS. 5A-5B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
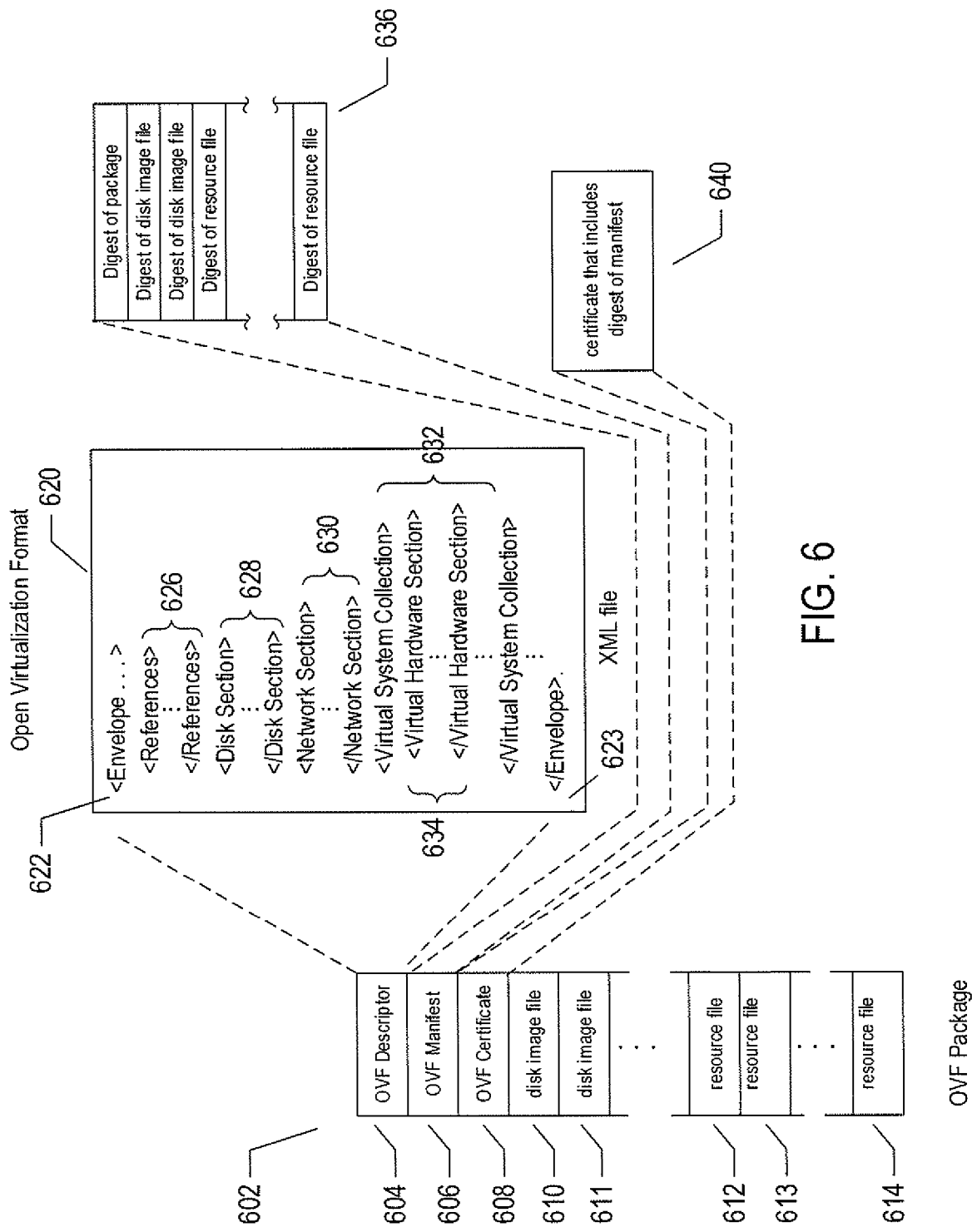
FIG. 6 shows an example of an open virtualization format package.

A VM or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a VM within one or more data files. FIG. 6 shows an OVF package. An OVF package 602 includes an OVF descriptor 604, an OVF manifest 606, an OVF certificate 608, one or more disk-image files 610-611, and one or more device files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a network section 630 that includes meta information about all of the logical networks included in the OVF package, and a collection of virtual-machine configurations 632 which further includes hardware descriptions of each VM 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and device files 612 are digitally encoded content, such as operating-system images. A VM or a collection of VMs encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more VMs that is encoded within an OVF package.

The advent of VMs and virtual environments has alleviated many of the difficulties and challenges associated with traditional general-purpose computing. Machine and operating-system dependencies can be significantly reduced or entirely eliminated by packaging applications and operating systems together as VMs and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers.

Figure 7:
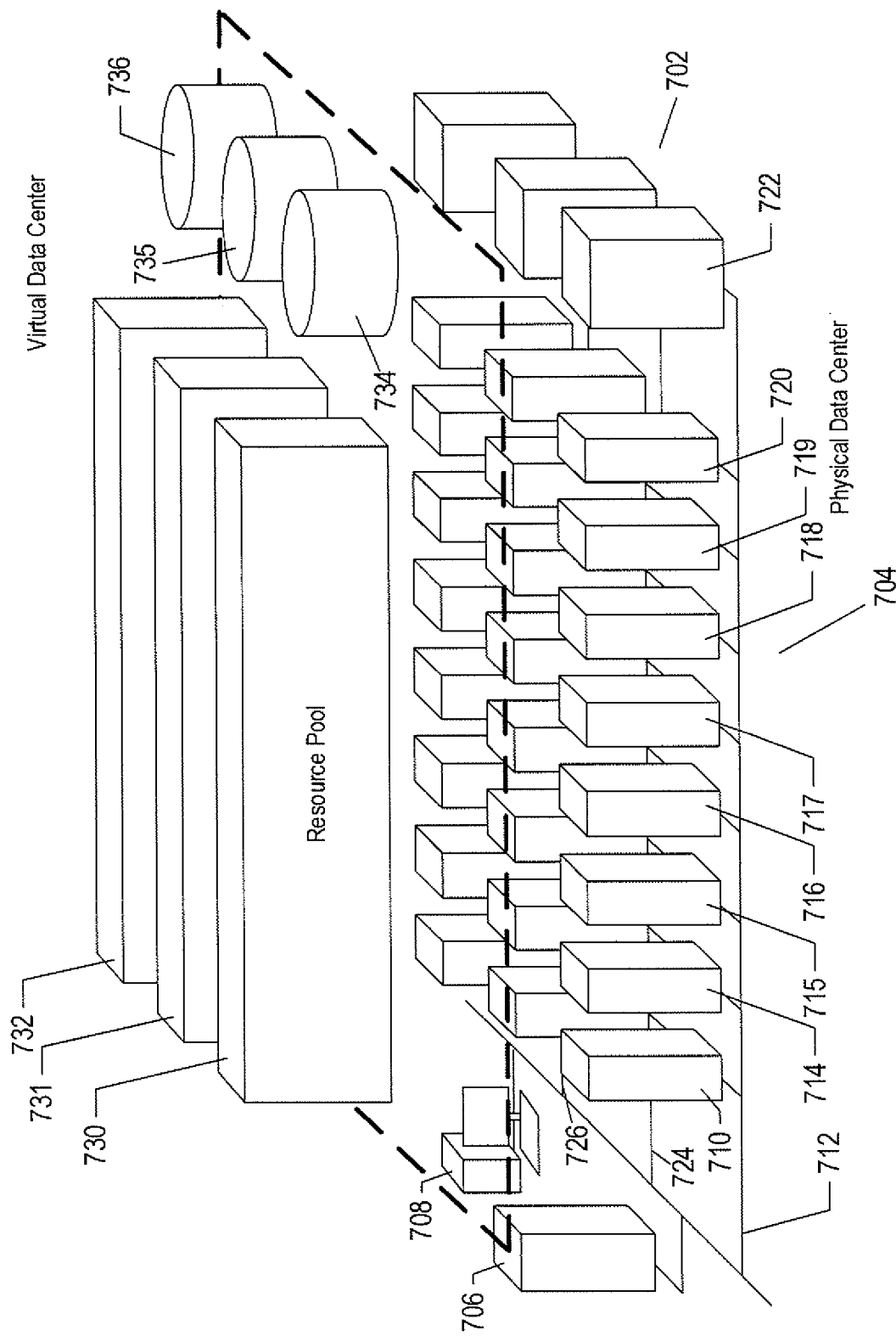
FIG. 7 shows virtual data centers provided as an abstraction of underlying physical-data-center hardware components.

FIG. 7 shows virtual data centers provided as an abstraction of underlying physical-data-center hardware components. In FIG. 7, a physical data center 702 is shown below a virtual-interface plane 704. The physical data center consists of a virtual-data-center management server 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple VMs. Different physical data centers may include many different types of computers, networks, data-storage systems and devices connected according to many different types of connection topologies. The virtual-interface plane 704, a logical abstraction layer shown by a plane in FIG. 7, abstracts the physical data center to a virtual data center comprising one or more device pools, such as device pools 730-732, one or more virtual data stores, such as virtual data stores 734-736, and one or more virtual networks. In certain implementations, the device pools abstract banks of physical servers directly interconnected by a local area network.

The virtual-data-center management interface allows provisioning and launching of VMs with respect to device pools, virtual data stores, and virtual networks, so that virtual-data-center administrators need not be concerned with the identities of physical-data-center components used to execute particular VMs. Furthermore, the virtual-data-center management server 706 includes functionality to migrate running VMs from one physical server to another in order to optimally or near optimally manage device allocation, provide fault tolerance, and high availability by migrating VMs to most effectively utilize underlying physical hardware devices, to replace VMs disabled by physical hardware problems and failures, and to ensure that multiple VMs supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the devices of individual physical servers and migrating VMs among physical servers to achieve load balancing, fault tolerance, and high availability.

Figure 8:
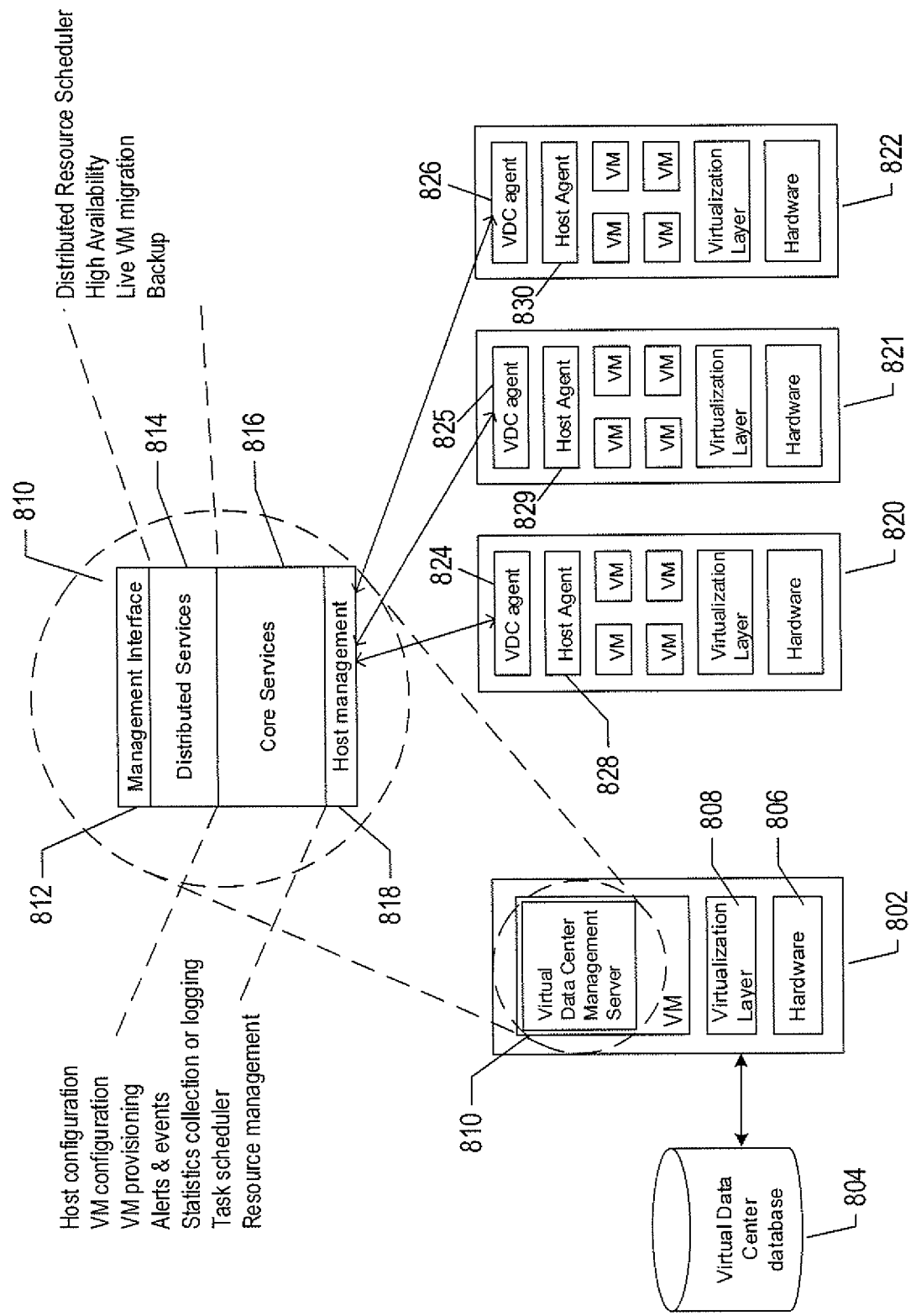
FIG. 8 shows virtual-machine components of a virtual-data-center management server and physical servers of a physical data center.

FIG. 8 shows virtual-machine components of a virtual-data-center management server and physical servers of a physical data center above which a virtual-data-center interface is provided by the virtual-data-center management server. The virtual-data-center management server 802 and a virtual-data-center database 804 comprise the physical components of the management component of the virtual data center. The virtual-data-center management server 802 includes a hardware layer 806 and virtualization layer 808, and runs a virtual-data-center management-server VM 810 above the virtualization layer. Although shown as a single server in FIG. 8, the virtual-data-center management server ("VDC management server") may include two or more physical server computers that support multiple VDC-management-server virtual appliances. The VM 810 includes a management-interface component 812, distributed services 814, core services 816, and a host-management interface 818. The management interface 818 is accessed from any of various computers, such as the PC 708 shown in FIG. 7. The management interface 818 allows the virtual-data-center administrator to configure a virtual data center, provision VMs, collect statistics and view log files for the virtual data center, and to early out other, similar management tasks. The host-management interface 818 interfaces to virtual-data-center agents 824, 825, and 826 that execute as VMs within each of the physical servers of the physical data center that is abstracted to a virtual data center by the VDC management server.

The distributed services 814 include a distributed-device scheduler that assigns VMs to execute within particular physical servers and that migrates VMs in order to most effectively make use of computational bandwidths, data-storage capacities, and network capacities of the physical data center. The distributed services 814 further include a high-availability service that replicates and migrates VMs in order to ensure that VMs continue to execute despite problems and failures experienced by physical hardware components. The distributed services 814 also include a live-virtual-machine migration service that temporarily halts execution of a VM, encapsulates the VM in an OVF package, transmits the OVF package to a different physical server, and restarts the VM on the different physical server from a virtual-machine state recorded when execution of the VM was halted. The distributed services 814 also include a distributed backup service that provides centralized virtual-machine backup and restore.

The core services 816 provided by the VDC management server 810 include host configuration, virtual-machine configuration, virtual-machine provisioning, generation of virtual-data-center alarms and events, ongoing event logging and statistics collection, a task scheduler, and a device-management module. Each physical server 820-822 also includes a host-agent VM 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce device allocations made by the VDC management server 810, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational devices of a cloud-computing facility to cloud-computing-infrastructure users. A cloud-director management server exposes virtual devices of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
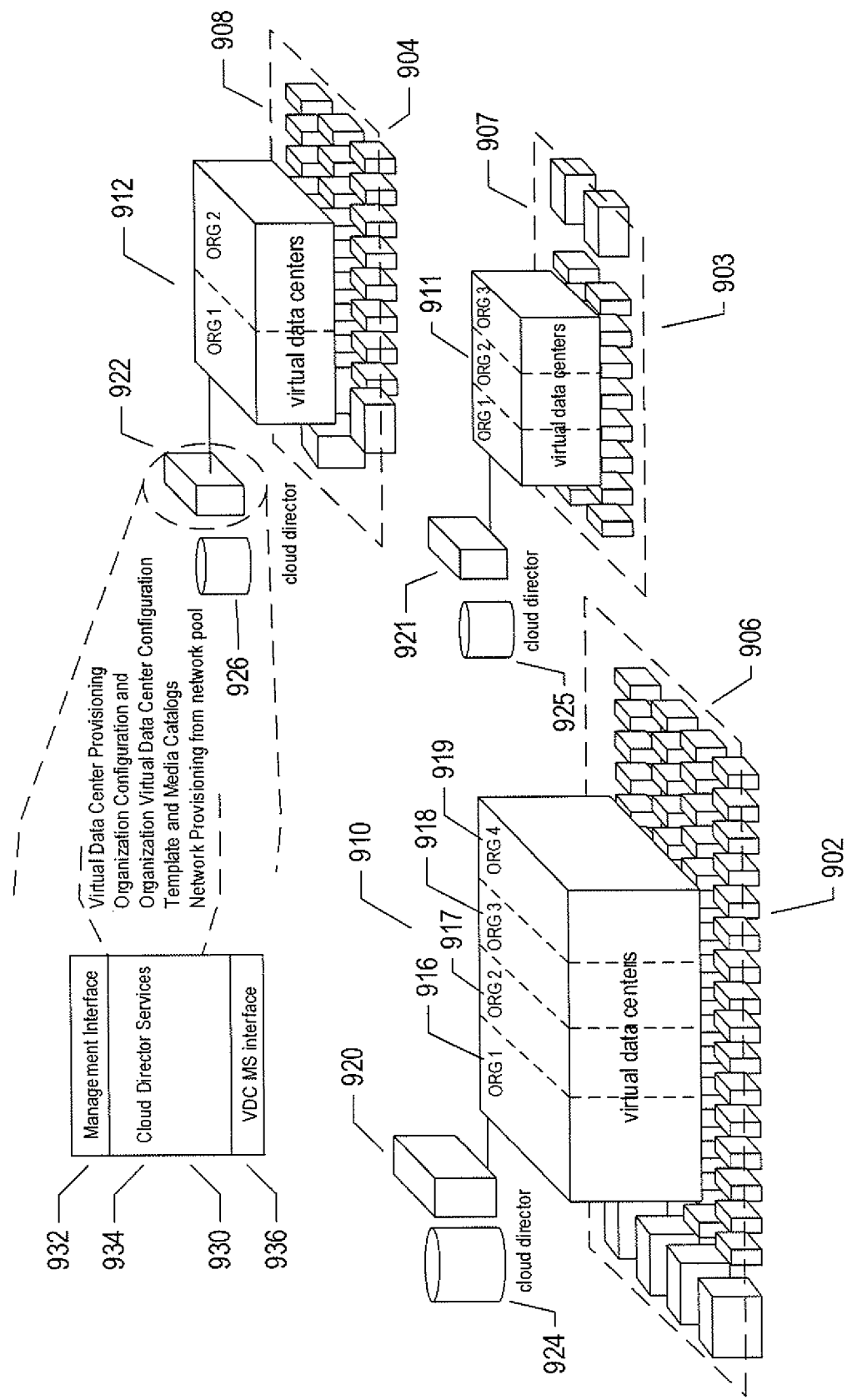
FIG. 9 shows a cloud-director level of abstraction.

FIG. 9 shows a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The devices of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are VMs that each contains an OS and/or one or more VMs containing applications. A template may include much of the detailed contents of VMs and virtual appliances that are encoded within OVF packages, so that the task of configuring a VM or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
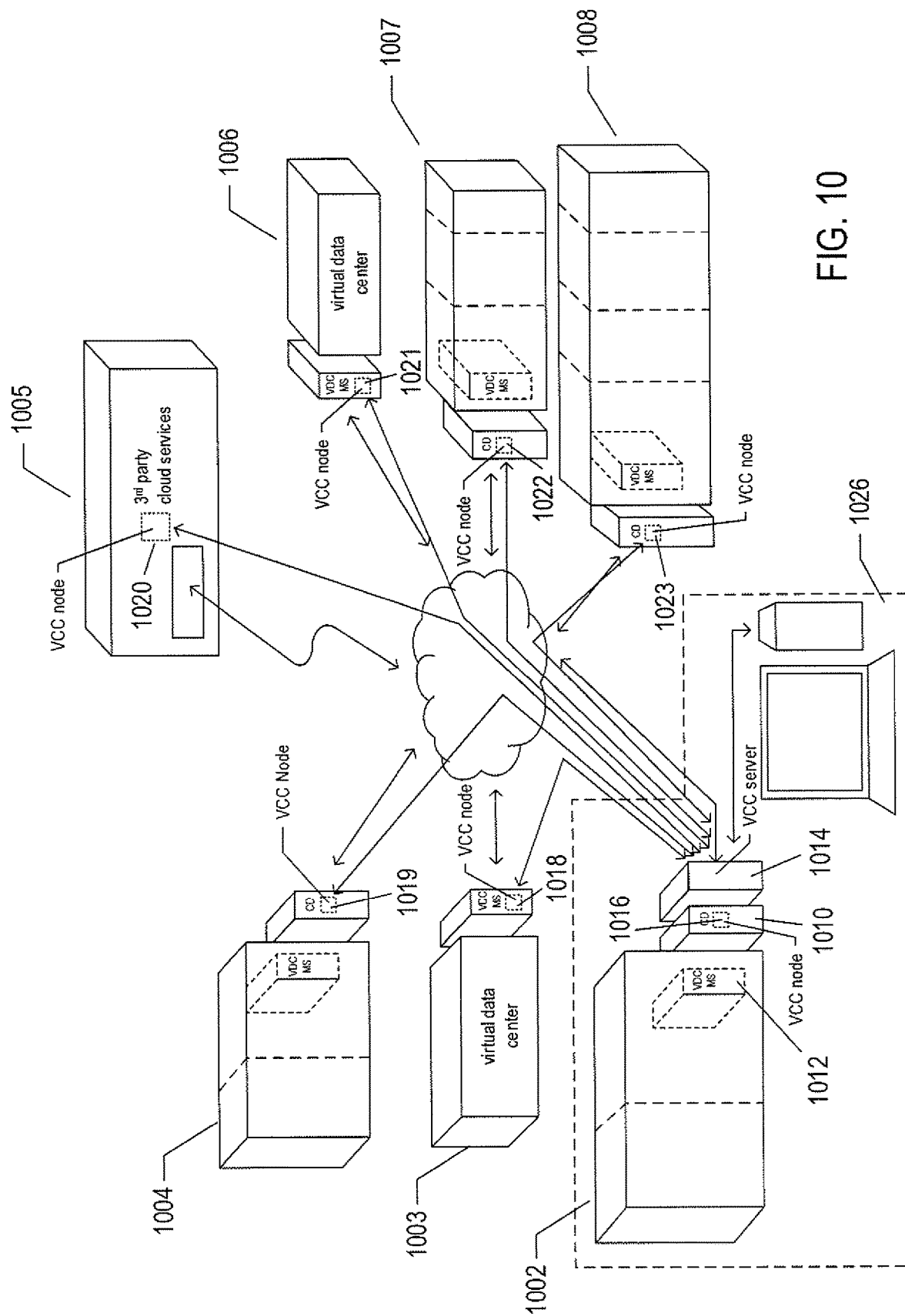
FIG. 10 shows virtual-cloud-connector nodes.

FIG. 10 shows virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are shown 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Containers and Containers Supported by Virtualization Layers

As mentioned above, while the virtual-machine-based virtualization layers, described in the previous subsection, have received widespread adoption and use in a variety of different environments, from personal computers to enormous distributed computing systems, traditional virtualization technologies are associated with computational overheads. While these computational overheads have steadily decreased, over the years, and often represent ten percent or less of the total computational bandwidth consumed by an application running above a guest operating system in a virtualized environment, traditional virtualization technologies nonetheless involve computational costs in return for the power and flexibility that they provide.

While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system of the host. In essence, OSL virtualization uses operating-system features, such as namespace isolation, to isolate each container from the other containers running on the same host. In other words, namespace isolation ensures that each application is executed within the execution environment provided by a container to be isolated from applications executing within the execution environments provided by the other containers. A container cannot access files not included the container's namespace and cannot interact with applications running in other containers. As a result, a container can be booted up much faster than a VM, because the container uses operating-system-kernel features that are already available and functioning within the host. Furthermore, the containers share computational bandwidth, memory, network bandwidth, and other computational resources provided by the operating system, without the overhead associated with computational resources allocated to VMs and virtualization layers. Again, however, OSL virtualization does not provide many desirable features of traditional virtualization. As mentioned above, OSL virtualization does not provide a way to run different types of operating systems for different groups of containers within the same host and OSL-virtualization does not provide for live migration of containers between hosts, high-availability functionality, distributed resource scheduling, and other computational functionality provided by traditional virtualization technologies.

Figure 11:
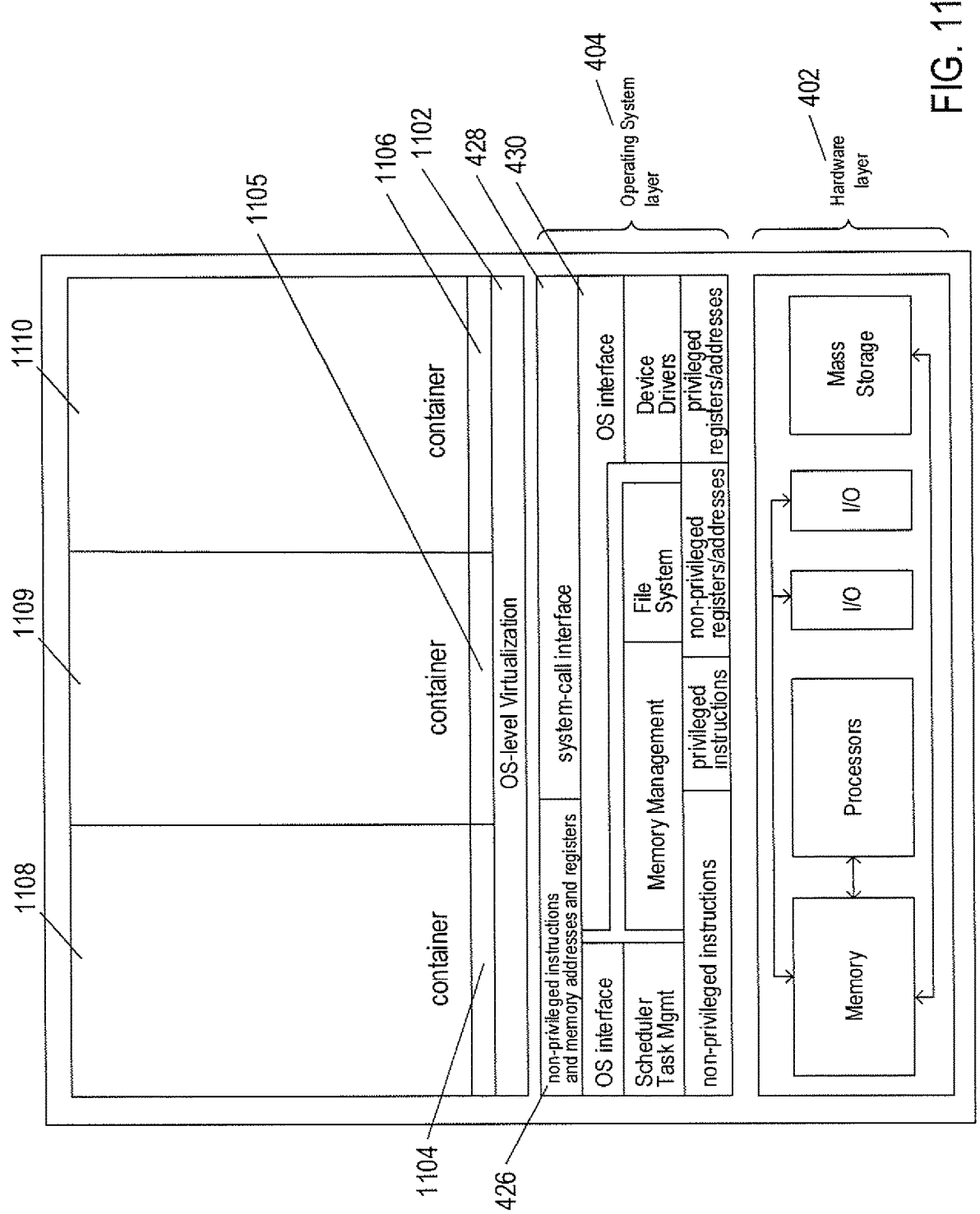
FIG. 11 shows an example server computer used to host three containers.

FIG. 11 shows an example server computer used to host three containers. As discussed above with reference to FIG. 4, an operating system layer 404 runs above the hardware 402 of the host computer. The operating system provides an interface, for higher-level computational entities, that includes a system-call interface 428 and the non-privileged instructions, memory addresses, and registers 426 provided by the hardware layer 402. However, unlike in FIG. 4, in which applications run directly above the operating system layer 404, OSL virtualization involves an OSL virtualization layer 1102 that provides operating-system interfaces 1104-1106 to each of the containers 1108-1110. The containers, in turn, provide an execution environment for an application that runs within the execution environment provided by container 1108. The container can be thought of as a partition of the resources generally available to higher-level computational entities through the operating system interface 430.

Figure 12:
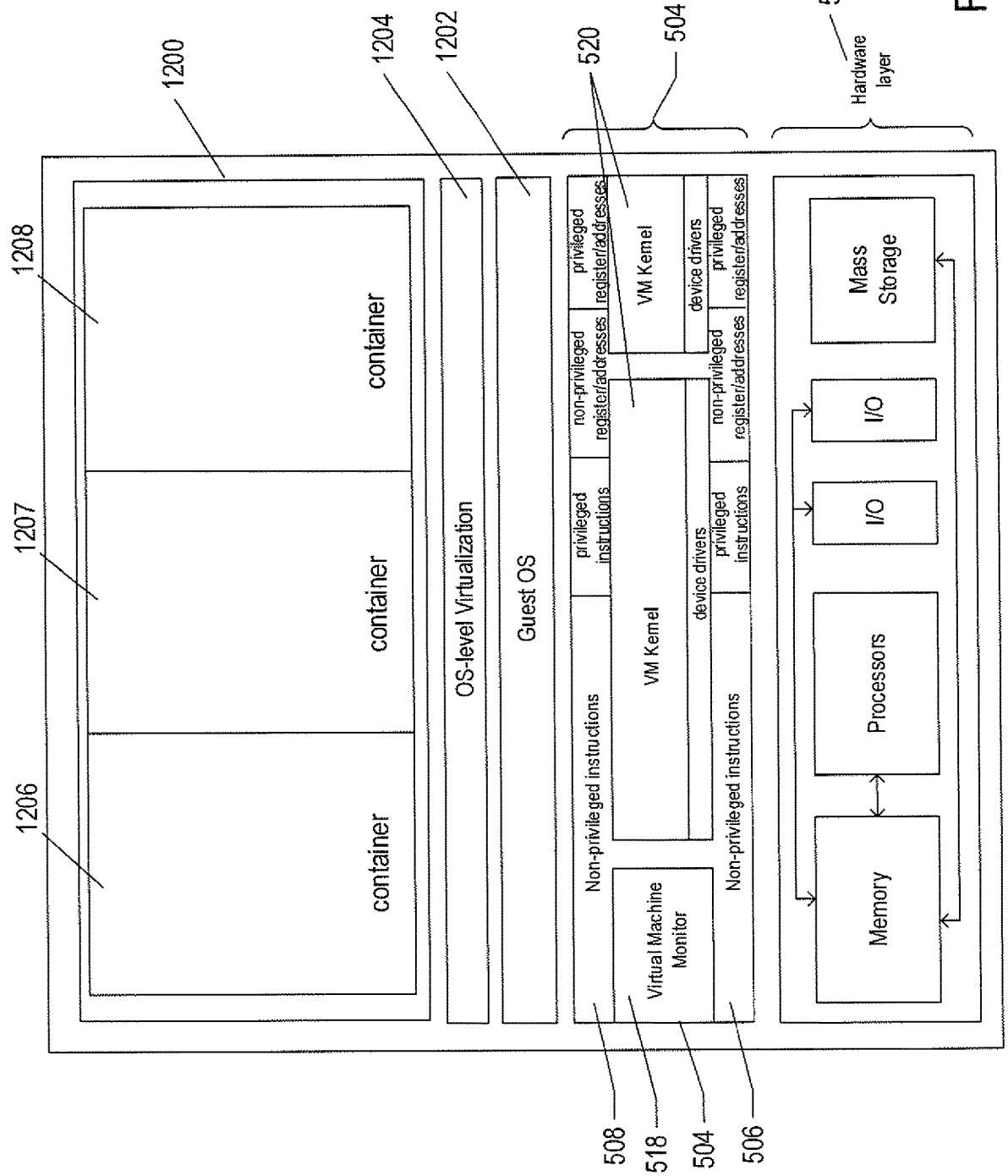
FIG. 12 shows an approach to implementing the containers on a VM.

FIG. 12 shows an approach to implementing the containers on a VM. FIG. 12 shows a host computer similar to that shown in FIG. 5A, discussed above. The host computer includes a hardware layer 502 and a virtualization layer 504 that provides a virtual hardware interface 508 to a guest operating system 1102. Unlike in FIG. 5A, the guest operating system interfaces to an OSL-virtualization layer 1104 that provides container execution environments 1206-1208 to multiple application programs.

Note that, although only a single guest operating system and OSL virtualization layer are shown in FIG. 12, a single virtualized host system can run multiple different guest operating systems within multiple VMs, each of which supports one or more OSL-virtualization containers. A virtualized, distributed computing system that uses guest operating systems running within VMs to support OSL-virtualization layers to provide containers for running applications is referred to, in the following discussion, as a "hybrid virtualized distributed computing system."

Running containers above a guest operating system within a VM provides advantages of traditional virtualization in addition to the advantages of OSL virtualization. Containers can be quickly booted in order to provide additional execution environments and associated resources for additional application instances. The resources available to the guest operating system are efficiently partitioned among the containers provided by the OSL-virtualization layer 1204 in FIG. 12, because there is almost no additional computational overhead associated with container-based partitioning of computational resources. However, many of the powerful and flexible features of the traditional virtualization technology can be applied to VMs in which containers run above guest operating systems, including live migration from one host to another, various types of high-availability and distributed resource scheduling, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides for flexible and scaling over large numbers of hosts within large distributed computing systems and a simple approach to operating-system upgrades and patches. Thus, the use of OSL virtualization above traditional virtualization in a hybrid virtualized distributed computing system, as shown in FIG. 12, provides many of the advantages of both a traditional virtualization layer and the advantages of OSL virtualization.

Methods to Quantize and Compress Time Series Data

Figure 13:
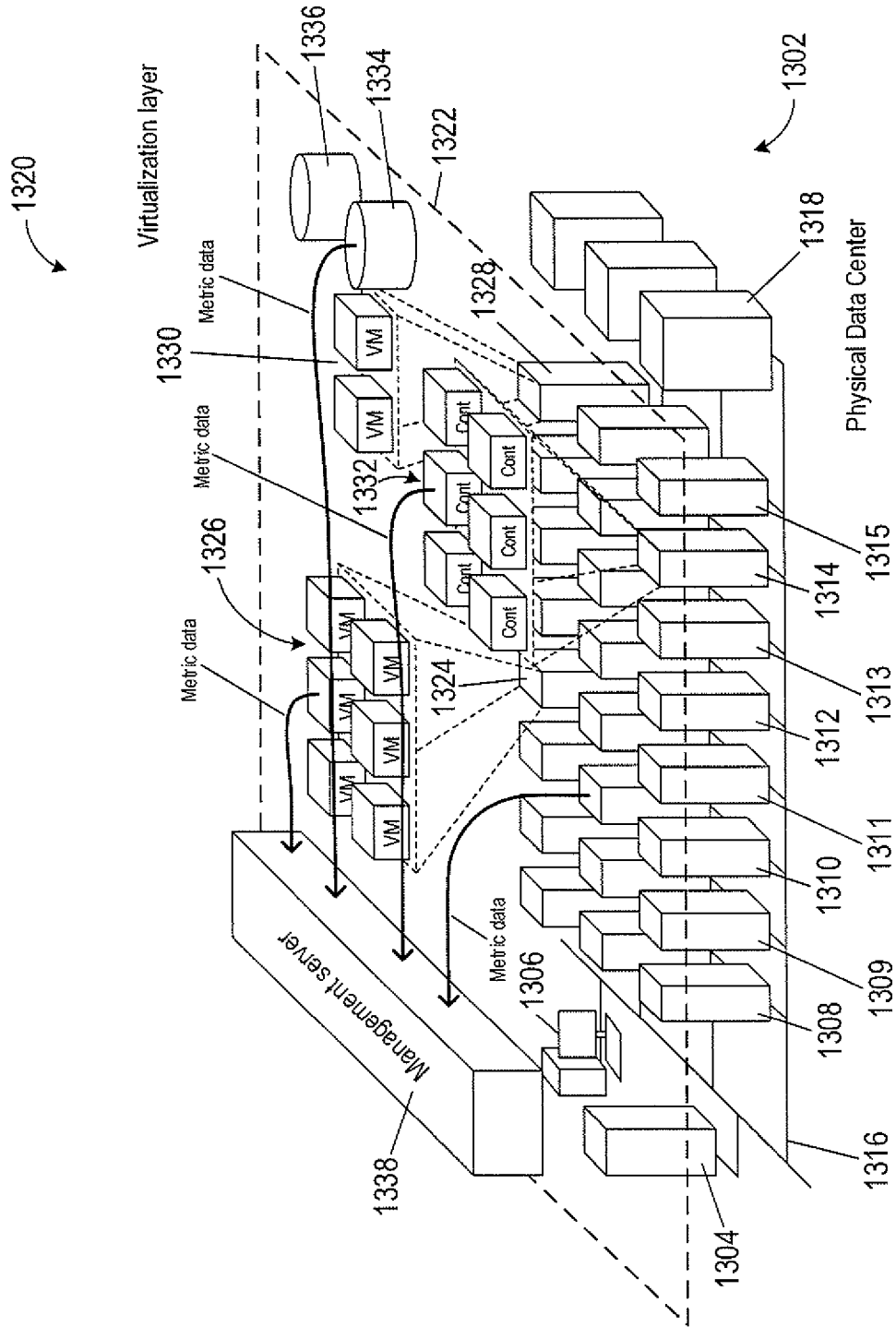
FIG. 13 shows example sources of time series data in a physical data center.

FIG. 13 shows example sources of time series data in a physical data center. The physical data center 1302 comprises a management server computer 1304 and any of various computers, such as PC 1306, on which a virtual-data-center management interface may be displayed to system administrators and other users. The physical data center 1302 additionally includes server computers, such as server computers 1308-1315, that are coupled together by local area networks, such as local area network 1316 that directly interconnects server computers 1308-1315 and a mass-storage array 1318. The physical data center 1302 includes three local area networks that each directly interconnects a bank of eight server computers and a mass-storage array. Different physical data centers may include many different types of computers, networks, data-storage systems and devices connected according to many different types of connection topologies. A virtual-interface plane 1322 separates a virtualization layer 1320 from the physical data center 1804. The virtualization layer 1320 includes virtual objects, such as VMs and containers, hosted by the server computers in the physical data center 1302. Certain server computers host VMs as described above with reference to FIGS. 5A-5B. For example, server computer 1324 is a host for six VMs 1326 and server computer 1328 is a host for two VMs 1330. Other server computers may host containers as described above with reference to FIGS. 11 and 12. For example, server computer 1314 is a host for six containers 1832. The virtual-interface plane 1322 abstracts the physical data center 1302 to one or more VDCs comprising the virtual objects and one or more virtual data stores, such as virtual data stores 1334 and 1336, and one or more virtual networks. For example, one VDC may comprise VMs 1326 and virtual data store 1334 and another VDC may comprise VMs 1330 and virtual data store 1336.

FIG. 13 also shows a management server 1338 located in the virtualization layer 1320 and hosted by the management server computer 1304. The management server 1338 receives and stores time series data generated by various physical and virtual resources. The physical resources include processors, memory, network connections, and storage of each computer system, mass-storage devices, and other physical components of the physical data center 1804. Virtual resources also include virtual processors, memory, network connections and storage of the virtualization layer 1320. The management server 1338 monitors physical and virtual resources by collecting time series data from the physical and virtual objects. Time series data includes physical and virtual CPU usage, amount of memory, network throughput, network traffic, and amount of storage. CPU usage is a measure of CPU time used to process instructions of an application program or operating system as a percentage of CPU capacity. High CPU usage may be an indication of usually large demand for processing power, such as when an application program enters an infinite loop. Amount of memory is the amount of memory (e.g., GBs) an object uses at a given time. Because time series data is collected with such high frequency, the data sets are extremely large and occupy large volumes of storage space within the physical data center 1302. In addition, because the data sets are large and each data set alone comprises a large amount of time series data points, the management server 1338 is typically overloaded and unable to timely detect anomalies, problems, and characterize each time series data set.

Figure 14:
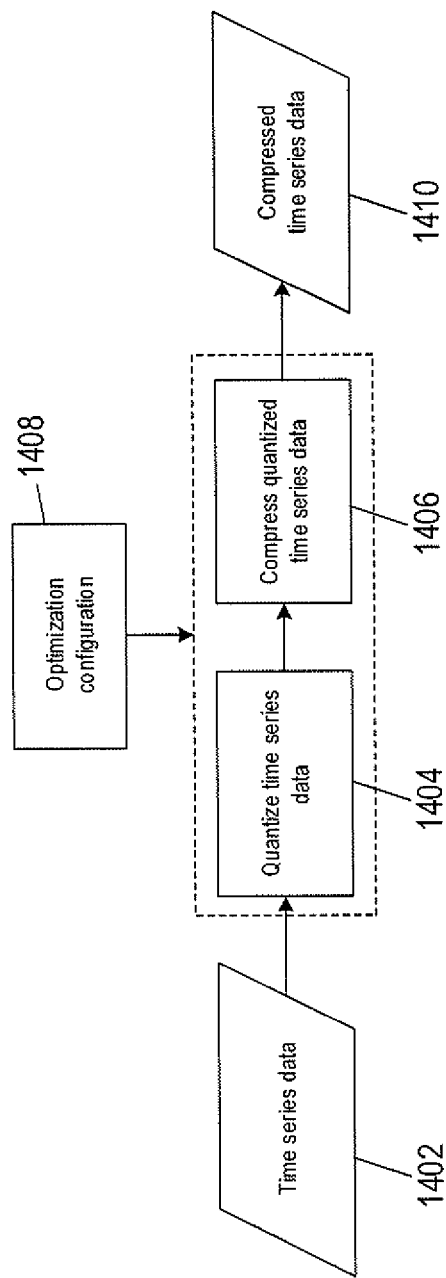
FIG. 14 shows a flow diagram of a method to optimize and compress the time series data stored in a data-storage device.

FIG. 14 shows a flow diagram of a method to optimize and compress the time series data stored in a data-storage device. The time series data 1402 may be time series metric data generated by a physical or virtual object of a distributed computing system. The time series data 1402 may be stored in a data-storage device, such as a mass-storage array, of the physical data center 1302. In block 1404, the time series data 1402 is quantized to generate quantized time series data. In general, quantization causes a loss of information recorded in the time series data. In block 1406, the quantized time series data is compressed to reduce the number of consecutive duplicate quantized data points in the quantized time series data. Quantization 1404 and compression 1406 are performed subject to an optimization configuration 1406 that comprises a user selected limitation on loss of information or limitation on a compression rate. The user can put a limitation on the accuracy of information loss created by quantization or put a limitation on the compression rate. For example, the user may choose to maximize the accuracy (i.e., minimize data loss) and put a constraint on the compression rate. Alternatively, the user may choose to maximize the compression rate and put a constraint on the accuracy. Compressed time series data 1410 is output and used to replace the original time series data 1402 in the data-storage device. For example, the time series data may be deleted from the data-storage device and the compressed time series data written to the data-storage device. Alternatively, the time series data may be over written by the compressed time series data. The compressed time series data 1410 occupies far less storage space than the original time series data 1402, freeing storage space in the data-storage device. The smaller data set of compressed time series data 1410 enables faster and more timely analysis by the management server 1338 to detect anomalies and problems at the resource.

A sequence of time series data is denoted by $$x_k = x(t_k), k=1, \ldots, N \qquad (1)$$

where
subscript k is a time index;
N is the number of data points;

$x(t_k)$ is a data point; and $t_k$ is a time stamp that represents when the data point is recorded.

The collection of time series data in Equation (1) may be also be represented as a sequence $X=\{x_k\}_{k=1}^{N}$.

Figure 15:
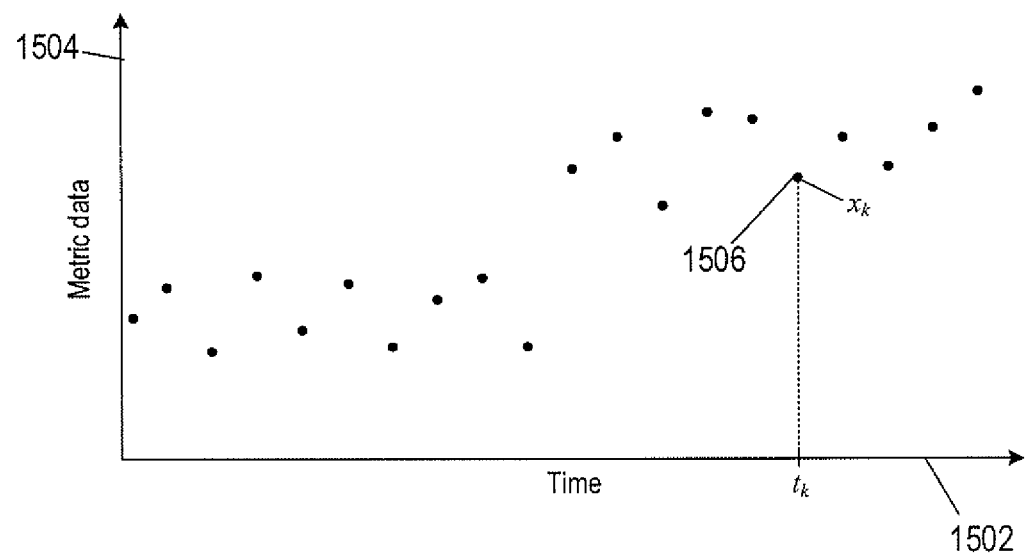
FIG. 15 shows a plot of example time series data.

FIG. 15 shows a plot of example time series data. Horizontal axis 1502 represents time. Vertical axis 1504 represents a range of metric data values. Dots represent individual data points recorded at corresponding time stamps. For example, dot 1506 represents a data point $x_k$ recorded at a time stamp $t_k$. The time series data may represent metric data generated by a physical or a virtual object. For example, the time series data may represent CPU usage of a core in a multicore processor of a server computer at each time stamp. Alternative, the time series data may represent the amount of virtual memory a VM uses at each time stamp.

Quantization is carried by partitioning time series data according to a selected number n of quantiles denoted by $q_1, q_2, \ldots, q_n$. The set of quantiles $\{q_i\}_{i=1}^{n}$ divides a data range of time series data into n+1 groups of data points based on the values of the data points in the time series data. Each group contains about the same fraction, or number, of data points of the time series data. For example, each group may contain N/(n+1) data points, where n+1 evenly divides N. On the other hand, n+1 may not divide N evenly and certain groups may contain one or more data points than other groups. The number of quantiles n may be selected in accordance with a user selected accuracy or compression rate as described below.

Figure 16:
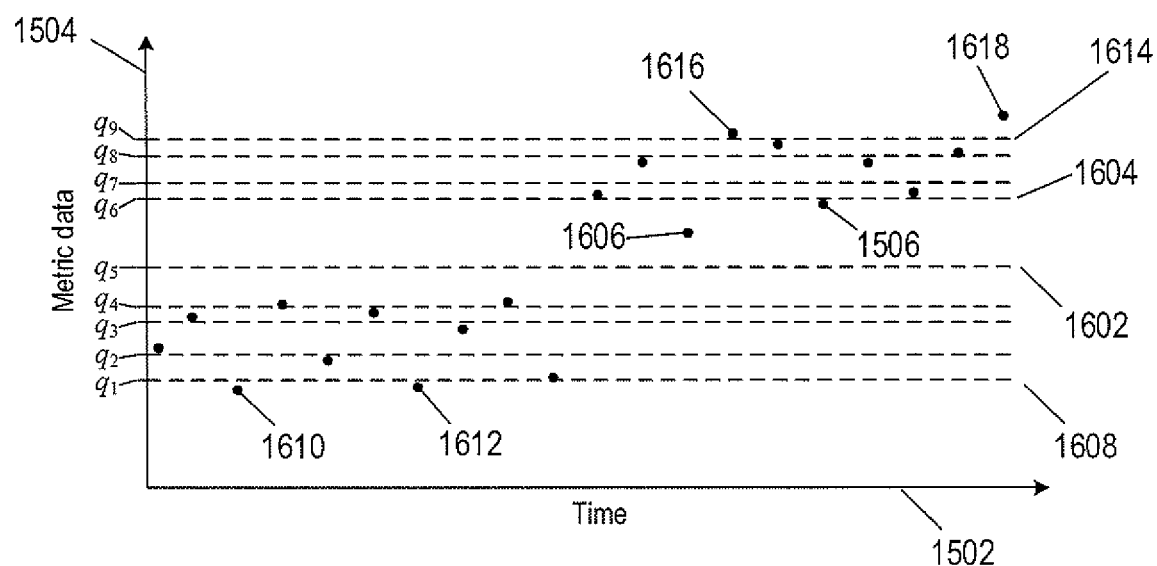
FIG. 16 shows a plot of an example sequence of time series data partitioned into ten groups of data points with nine example quantiles.

FIG. 16 shows the example sequence of time series data of FIG. 15 partitioned into ten groups of data points with nine example quantiles. The nine quantiles are denoted by $q_1, q_2, q_3, q_4, q_5, q_6, q_7, q_8$, and $q_9$. Horizontal dashed lines represent the nine quantiles that divide the values of the time series data into ten groups, each group containing two data points. For example, adjacent pairs of dashed lines 1602 and 1604 represent adjacent quantiles $q_5$ and $q_6$, respectively, that partition two data points 1606 and 1506 from other data points in the time series data. End dashed line 1608 represents the smallest quantile $q_1$ that partitions two data points 1610 and 1612 from the time series data. End dashed line 1614 represents the largest quantile $q_9$ that partitions two data points 1616 and 1618 from the time series data.

Quantization 1404 of time series data 1402 of FIG. 14 is carried by determining quantized time series data from the time series data and the n quantiles. Let $$x_k^q = x^q(t_k), k=1,\ldots,N \quad (2)$$

represent the quantized time series data. The sequence of quantized time series data is represented by $$X^q = \{x_k^q\}_{k=1}^{N}.$$

The quantized time series data $X^q$ is created from the time series data $X^q$ and the n quantiles as follows. Each quantized data point $x_k^q$ in the quantized time series data $X^q$ has a corresponding data point $x_k$ in the time series data X. Each quantized data point $x_k^q$ is assigned the value of the quantile in the set of quantiles $\{q_i\}_{i=1}^{n}$ that is closest to the corresponding data point $x_k$. For a data point $x_k$ in X, the closest unique quantile is given by $$\underset{i=1,\ldots,n}{\operatorname{argmin}} |x_k - q_i| = q_{i_0} \quad (3)$$

where $q_{i_0} \in \{q_i\}_{i=1}^{n}$ is the closest unique quantile to the data point $x_k$.

The corresponding quantized data point $x_k^q$ of the quantized time series data $X^q$ is assigned the value of the quantile $q_{i_0}$ closest to the data point $x_k$. A data point $x_k$ in X that is located midway between two quantiles, has two closest non-unique quantiles given by:

$$\operatorname{argmin}_{i=1,\ldots,n}|x_k - q_i| = q_{i_0} \text{ and } \operatorname{argmin}_{i=1,\ldots,n}|x_k - q_i| = q_{i_0+1} \quad (4)$$

where $q_{i_0}, q_{i_0+1} \in \{q_i\}_{i=1}^{n}$ are adjacent quantiles.

The data point $x_k$ is located midway between two adjacent quantiles $q_{i_0}$ and $q_{i_0+1}$. In this case, when the preceding quantized data point $x_{k-1}^q$ equals either $q_{i_0}$ and $q_{i_0+1}$, the quantized data point $x_k^q$ is assigned the value of $x_{k-1}^q$. Otherwise, when the preceding quantized data point $x_{k-1}^q$ does not equal either $q_{i_0}$ and $q_{i_0+1}$, then $x_k^q$ is assigned the larger of $q_{i_0}$ and $q_{i_0+1}$. Alternatively, $x_k^q$ is assigned the smaller of $q_{i_0}$ and $q_{i_0+1}$.

Accuracy of quantization of time series data can be measured using any one of the following loss functions ("LFs"):

$$LF = l_1 = \frac{1}{N}\sum_{k=1}^{N} |x_k - x_k^q| \quad (5)$$

$$LF = l_2 = \frac{1}{N}\sum_{k=1}^{N} |x_k - x_k^q|^2 \quad (6)$$

and $$LF = l_{med} = \operatorname{median}|x_k - x_k^q| \quad (7)$$

The value of a loss function is a measure of how much the quantized time series data $X^q$ differs from the time series data X. The larger a loss function value is, the farther, or more distant, the quantized time series data $X^q$ is from the time series data X.

Compression 1406 of the quantized time series data of FIG. 14 is created by elimination of sequential repetitions, or consecutive duplications, of quantized data points $x_k^q$ from the quantized time series data $X^q$. The remaining quantized time series data forms compressed time series data denoted by:

$$x_k^c = x^c(t_k), k=1,\ldots,M \quad (8)$$

where $M \leq N$.

The sequence of compressed time series data is represented by $X^c = \{x_k^c\}_{k=1}^{M}$.

The compression rate is given by:

$$CR = 100 \frac{N-M}{N} \quad (9)$$

The compression rate is a measure of how much of the time series data X has been reduced to obtain the compressed time series data $X^c$. A large compression rate corresponds to large amount of the quantized time series data having been removed as a result of compression. A small compression rate corresponds to small amount of the quantized time series data having been removed as a result of compression.

Figure 17:
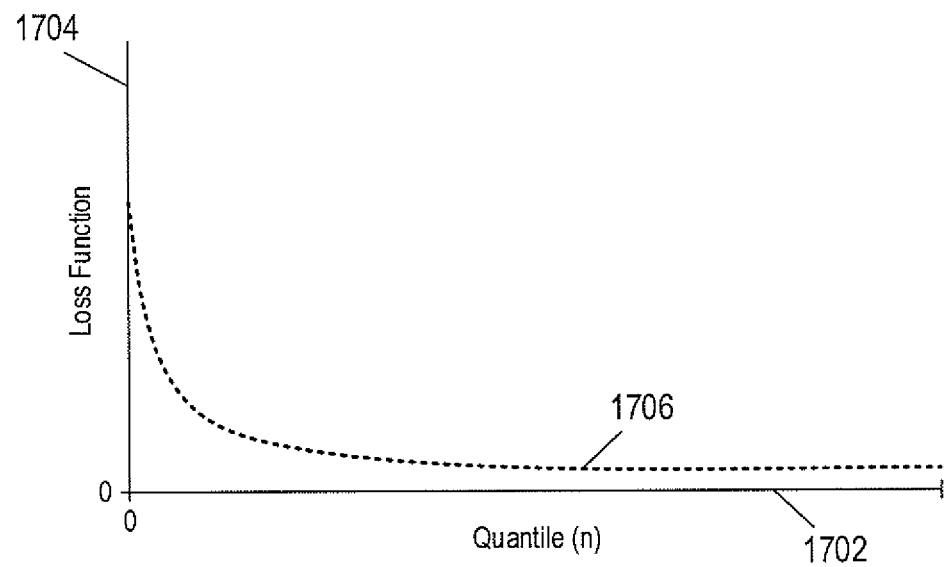
FIG. 17 shows a plot of loss function values versus quantiles.

Quantization creates a loss of information from the time series data. As the number of quantiles n is increased, the amount of information lost is decreased, as represented in FIG. 17. FIG. 17 shows a plot of a loss function versus quantiles. Horizontal axis 1702 represents a range of quantiles. Vertical axis 1704 represents a range of loss function values. Dashed curve 1706 represents the value of the loss function over the range quantiles. Note that as the number of quantiles increases, the loss function decreases. The asymptotic portion of the loss function indicates that continued increases in the number of quantiles achieves only a marginal decrease or insignificant decrease in the loss of information from the time series data.

Figure 18:
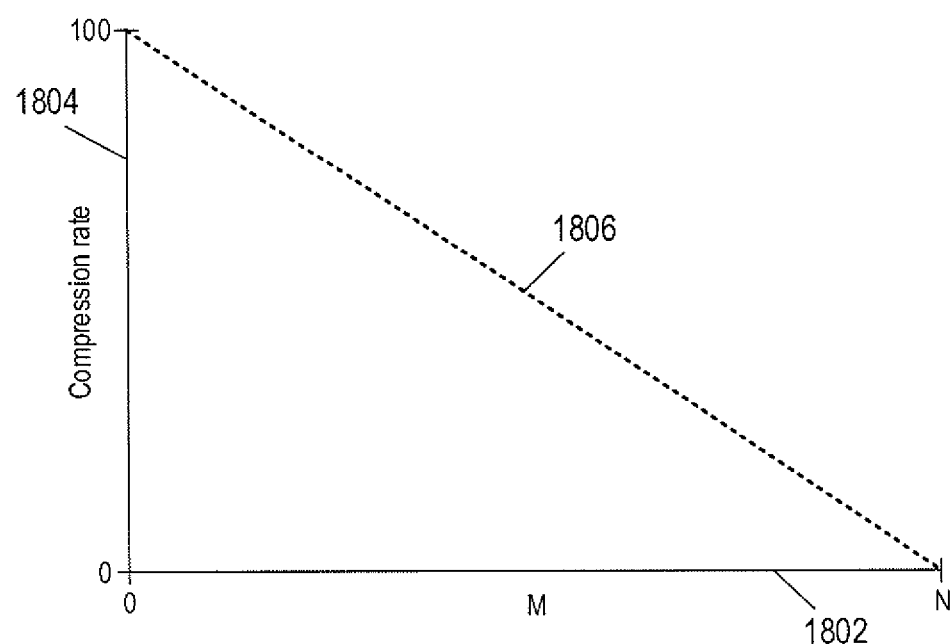
FIG. 18 shows a plot of the compression rate as a function M.

Compression, on the other hand, is a lossless transformation of the quantized time series data. In other words, information is not lost from compressing the quantized time series data. The compression rate is a linear function of the number M of quantized data points in the compressed time series data. FIG. 18 shows a plot of the compression rate as a function M. Horizontal axis 1802 represents a range of values for M between 0 and N. Vertical axis 1804 presents the range of compression rate values between 0 and 100. Negatively sloped line 1806 represents the compression rate. A small compression rate (i.e., large M) indicates that compression has resulted in a small reduction in the amount of data stored. In other words, as the number M approaches the number N, the amount of data storage used to store the compressed time series data $X^c$ approaches the amount of data storage used to store the original time series data X. As the number M approaches zero, the amount of data storage used to store the compressed time series data $X^c$ is far less than the storage used to store the original time series data X.

The number of quantiles, n, is ideally selected such that the loss function reaches a minimum:

$$LF \to \min \quad (10)$$

and the compression rate is maximized:

$$CR \to \max \quad (11)$$

However, simultaneously minimization of the loss function and maximization of the compression rate is not feasible. Maximization of the compression rate corresponds to an increase in the loss function. On the other hand, minimization of the loss function corresponds to a decrease in the compression rate. A user selects which of these optimization conditions to use in reducing the size of time series data.

This inability to simultaneously maximize the compression rate and minimize the loss function is resolved by allowing the user an opportunity to select from two optimization conditions. A first optimization condition allows a user to set an upper bound on the loss function while maximizing the compression rate as follows:

$$CR \to \max \quad (12)$$
$$LF \leq \Delta$$

where $\Delta$ is a loss function upper bound.

A second optimization condition allows a user to set a lower bound on the compression rate while minimizing the loss function as follows:

$$CR \geq r \quad (13)$$
$$LF \to \min$$

where r is a compression rate lower bound.

A user selects one of the above optimization conditions represented by Equations (12) and (13) to solve for a given number of quantiles n. In other implementations, the number of quantiles may be varied to determine an optimal number of quantiles n for either of the optimization conditions represented by Equations (12) and (13).

Optimization according to the condition in Equation (12) or the condition in Equation (13) is accomplished by iteratively quantizing and compressing the time series data for a given number of quantiles $q_1, q_2, \ldots, q_n$. In a first iteration, the time series data is separately quantized to each of the n quantiles to obtain n sequences of quantized time series data. Each sequence of quantized time series data is compressed to obtain n sets of compressed time series data. A loss function value and compression rate are computed for each set of the n sets of compressed time series data. The compressed time series data with corresponding loss function value and compression rate that best satisfies the optimization condition (12) or (13) is used to replace the original time series data. If none of the loss function values and corresponding compression rates satisfies the selected optimization condition, the method proceeds to a second iteration. In the second iteration, quantization and compression are carried out on the time series data for each combination of two of the quantiles $q_1, q_2, \ldots, q_n$ to obtain sets of compressed time series data and corresponding loss function values and compression rates. The compressed time series data with corresponding loss function value and compression rate that satisfies the selected optimization condition is used to replace the original time series data. If none of the loss function values and corresponding compression rates satisfies the selected optimization condition, the method proceeds to a third iteration.

With each iteration, the number of combinations of quantiles used to quantize the original time series data is given by:

$$C(n, m) = \frac{n!}{m!(n-m)!} \quad (14)$$

where m<n; and m is the m-th iteration and corresponds to the number of quantiles in the set of n quantiles used to quantize and compress the original time series data.

The number of compressed time series data is C(n, m). A loss function value and compression rate is computed for each compressed time series data. As a result, each compressed time series data has an associated loss function value and compression rate represented by:

$$X^c \to (CR, LF) \quad (15)$$

When a compression rate and loss function value satisfy the selected optimization condition of Equation (12) or (13), the process stops and the associated compressed time series data is used to replace the original time series data.

FIGS. 19-23 illustrate the first and second iterations of quantization and compression of the time series data shown in FIG. 15 using the nine quantiles shown in FIG. 16. In the first iteration, combinations index m equals 1 and the number of combinations of the nine quantiles is C(9,1)=1. In other words, quantization and compression are carried out in the same manner for each of the quantiles $q_1, q_2, q_3, q_4, q_5, q_6, q_7, q_8$, and $q_9$.

Figure 19A:
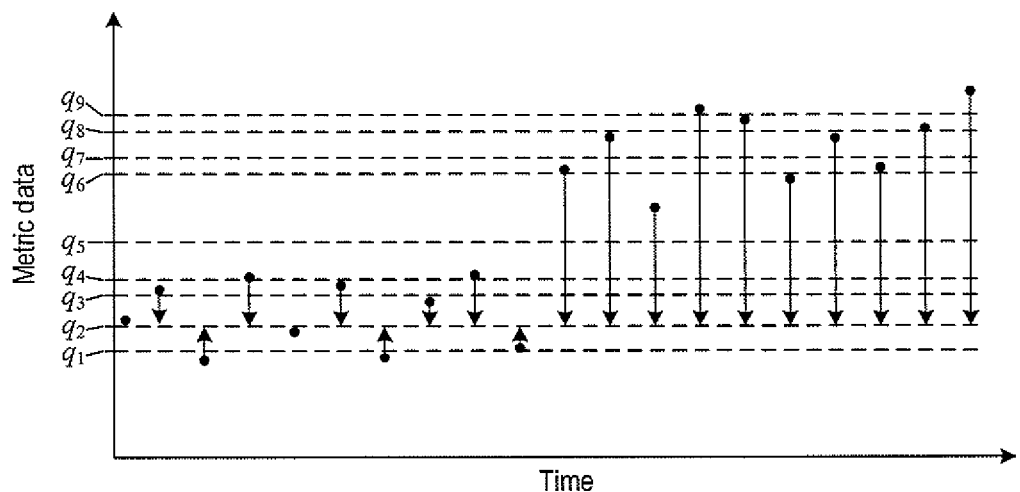
FIGS. 19A-19C show an example of quantizing and compressing the time series data shown in FIG. 15 to a single quantile.
Figure 19B:
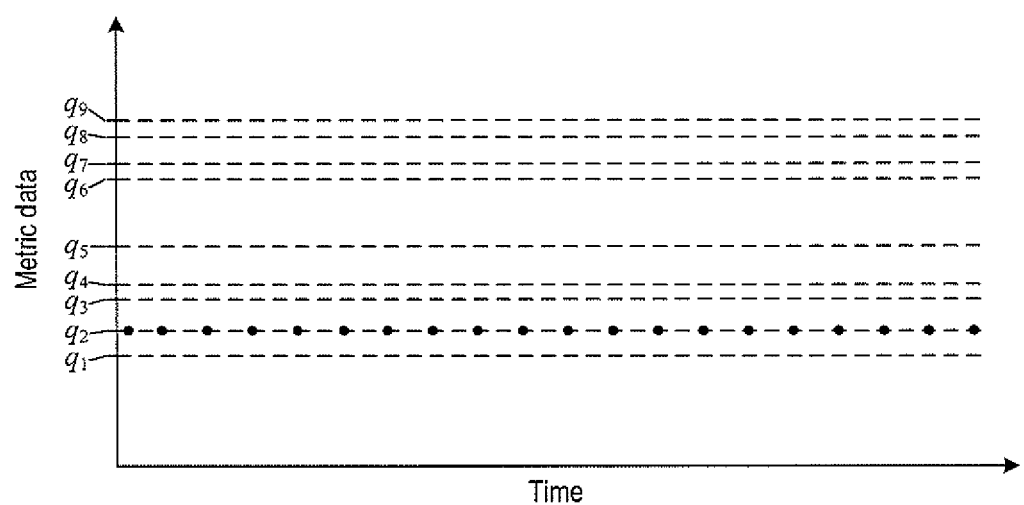
Figure 19C:
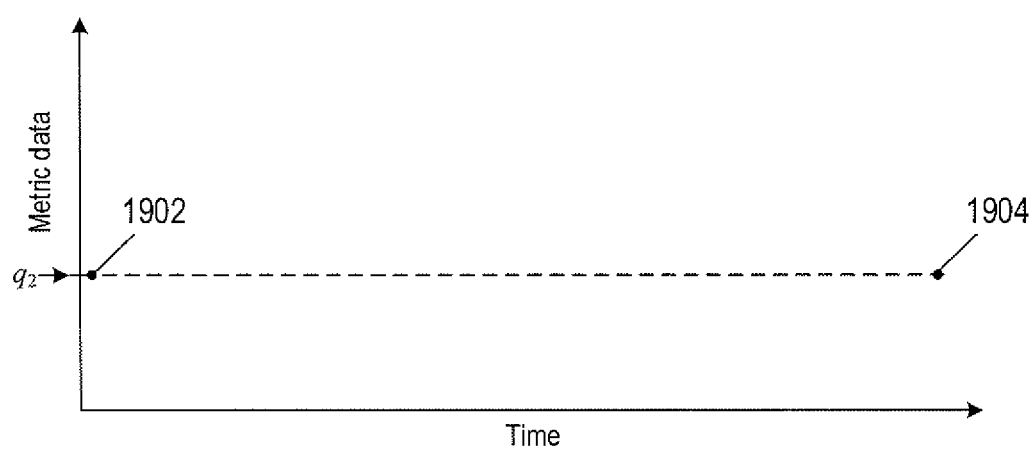

FIGS. 19A-19C show an example of quantizing and compressing the example sequence of time series data shown in FIG. 15 to the quantile $q_2$ of a first iteration. FIG.

19A shows directional arrows that represent quantization of the time series data to the quantile $q_2$. Note that because only one quantile is considered at a time in the first iteration, the data points of the time series data are all quantized to the same quantile, which in this case is the quantile $q_2$. FIG. 19B shows the quantized time series data that result from quantization to the quantile $q_2$. The quantized time series data is represented by $x_k = q_2$, for k=1, . . . , 20. Compression eliminates sequential repetitions in the quantized time series data. In one implementation, the first data point in a sequential repetition of the quantized time series data is retained and the other data points in the sequence are deleted. In another implementation, the first and the last data points in a sequential repetition of the quantized time series data are retained and the data points between the first and last data points are deleted. For example, compression reduces the quantized time series data of FIG. 19B to a single data point $x_1^c = q_2$ 1902, as represented in FIG. 19C. Alternatively, compression reduces the quantized time series data of FIG. 19B to a two data points $x_1^c = q_2$ and $x_{20}^c = q_2$ as represented in FIG. 19C by data points 1902 and 1904, respectively. Any one of the loss functions given by Equations (5), (6), and (7) can be used to compute a loss function value to obtain a measure of the amount of lost information in performing the quantization step. The compression rate calculated according to Equation (9) is 100((20−1)/20)=95%.

Figure 20:
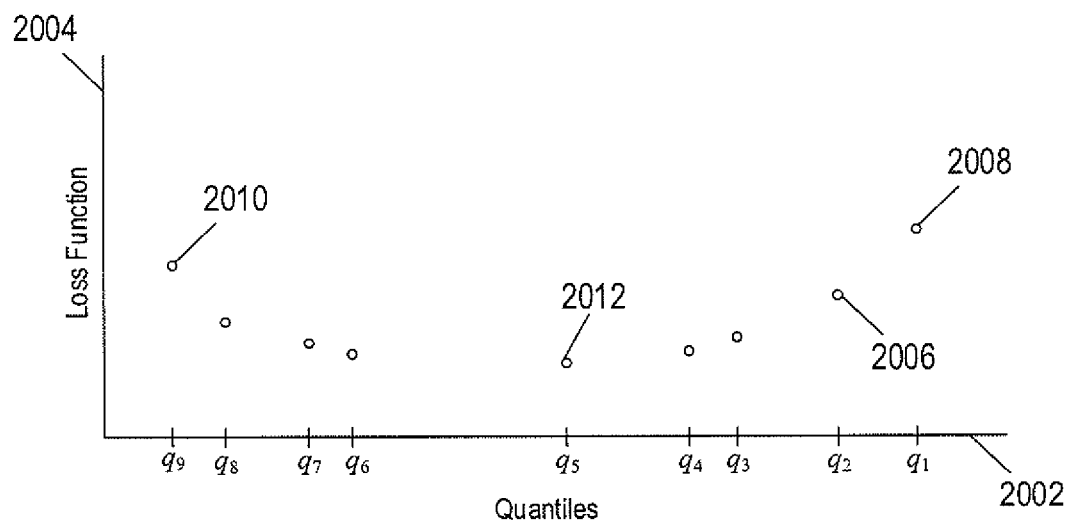
FIG. 20 shows a plot of example loss function values versus quantiles.

For the first iteration, quantization and compression are carried out in the same manner as represented in FIGS. 19A-19C for each of the remaining quantiles $q_1$, $q_3$, $q_4$, $q_5$, $q_6$, $q_7$, $q_8$, and $q_9$. A loss function value and compression rate is computed for each quantile. FIG. 20 shows a plot of example loss function values computed for each of the nine quantiles. The loss function values may be computed using one of the loss functions given by Equations (5), (6), and (7). Horizontal axis 2002 represents a range of quantiles. Vertical 2004 represents a range of loss function values. Open dots represent loss function values calculated for each of the quantized time series data obtained by quantization of the time series data to one of the quantiles. For example, dot 2006 represents the loss function value obtained from quantizing the time series data to the quantile $q_2$, as described above with reference to FIGS. 19A-19B. Note that loss function values 2008 and 2010 are largest for the quantiles $q_1$ and $q_9$, respectively, because these quantiles are farthest from most of the time series data. On the other hand, the loss function value 2012 for the quantile $q_5$ is the smallest, because the quantile $q_5$ is the median of the time series data and the closest quantile to all the data points.

Figure 21:
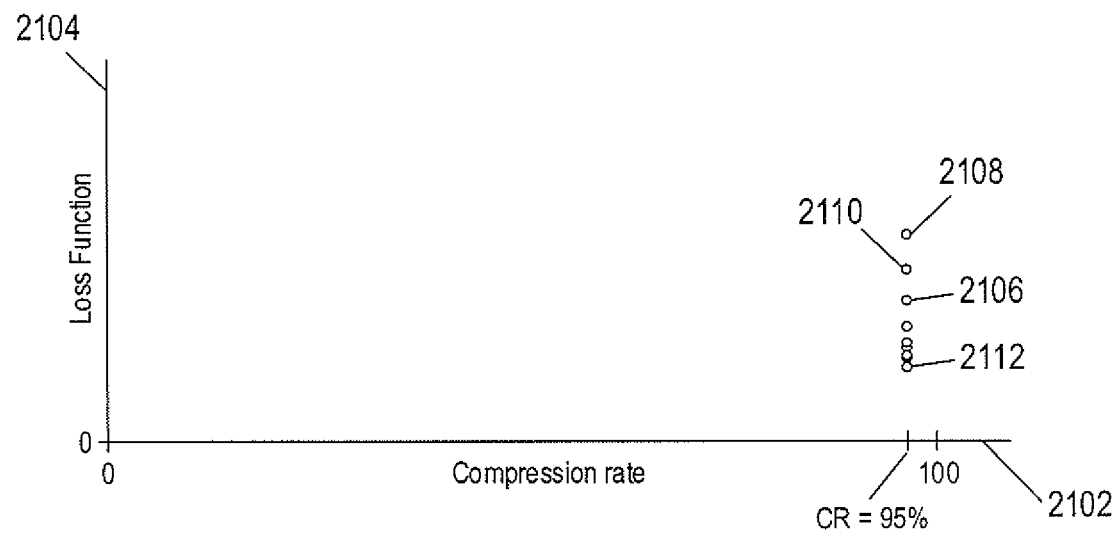
FIG. 21 shows a plot of loss function values versus compression rate.

Because quantized time series data includes sequential repeats of the data values, as shown in FIG. 19B, compression reduces each repeated sequence of quantized data points to a single value. Thus, the compressed time series data have the same compression rate of 95%. FIG. 21 shows a plot of the loss function values of FIG. 20 versus the compression rate. Horizontal axis 2102 represents a range of compression rates. Vertical axis 2104 represents a range of loss function values. Dots represent the loss function values for the same compression rate of 95%. For example, loss function values 2106, 2108, 2110, and 2112 correspond to the loss function values 2006, 2008, 2010, and 2012 in FIG. 20. Because the compressed time series data all have the same compression rate of 95%, the smallest loss function value is used to identify which compressed time series data best represents the original time series data for the first iteration. In this example, compressed time series data is $x_k^q = q_5$ has the smallest loss function value.

If a user has selected a loss function upper bound $\Delta$ for the optimization condition of the Equation (12) and the loss function values are greater than $\Delta$, then the method proceeds to the next iteration. If a user has selected a compression rate minimum r=96% for the optimization condition of Equation (13), the method proceeds to the next iteration because the compression rate for the quantiles is 95%.

In the second iteration, the combination index in equals 2 and the number of combinations of the nine quantiles is C(9,2)=36. In other words, quantization and compression are carried out for 36 combinations of two quantiles of the nine quantiles $q_2$, $q_3$, $q_4$, $q_5$, $q_6$, $q_7$, $q_8$, and $q_9$.

Figure 22A:
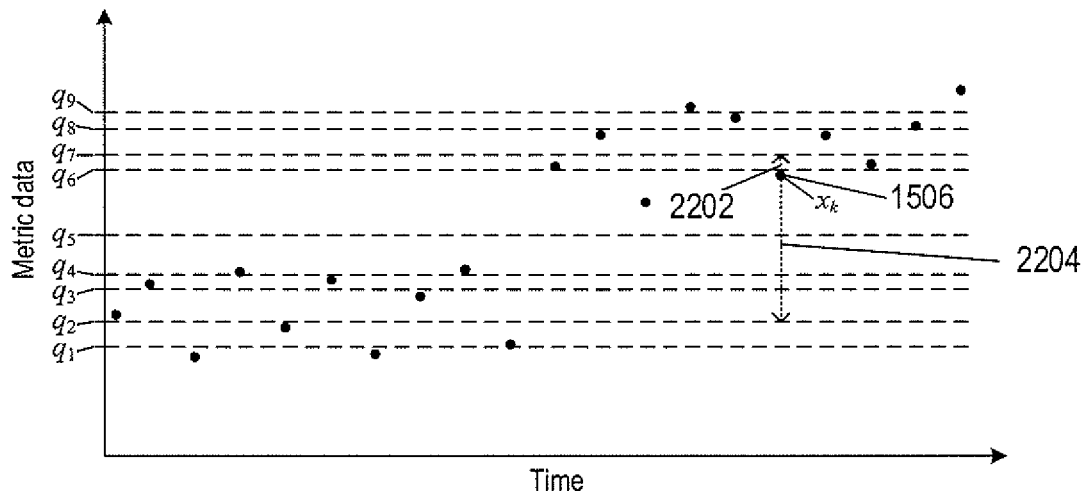
FIGS. 22A-22D show an example of quantizing and compressing the time series data shown in FIG. 15 to two quantiles.
Figure 22B:
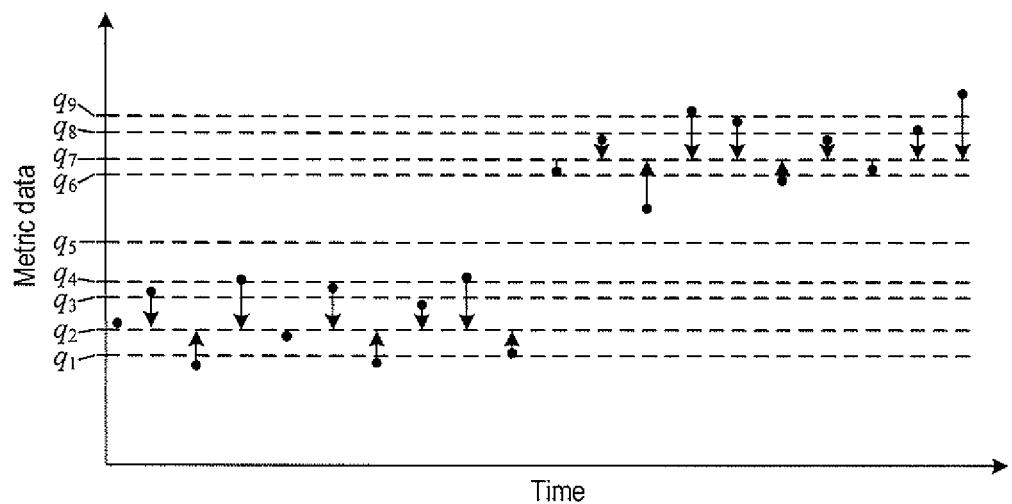
Figure 22C:
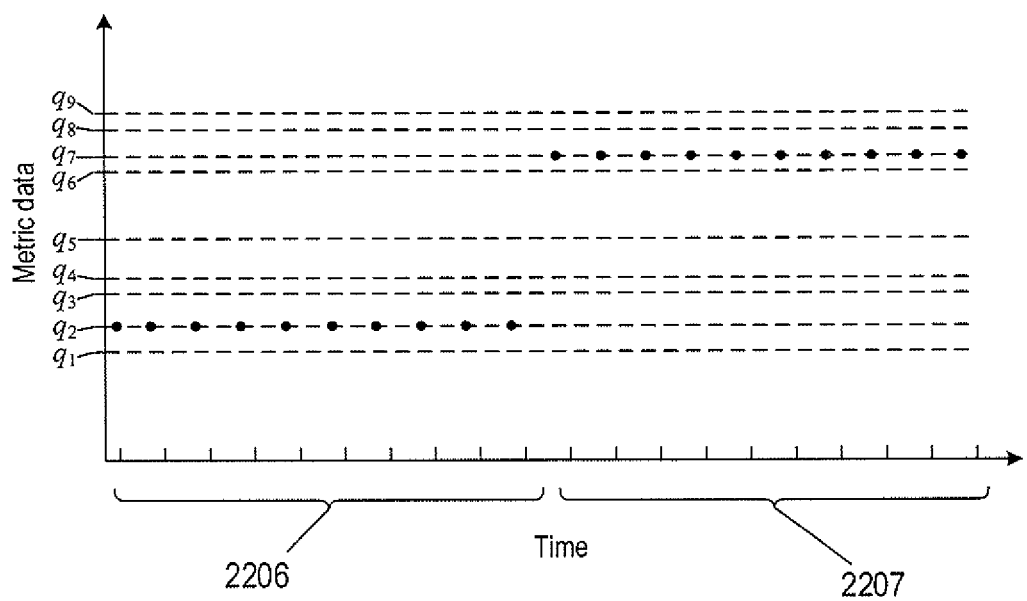

FIGS. 22A-22C show an example of quantization and compression carried out on the example sequence of time series data shown in FIG. 15 using the two quantiles $q_2$ and $q_7$ in a second iteration. In FIG. 22A, none of the data points are located midway between the two quantiles $q_2$ and $q_7$. Unlike the case where there is only one quantile to quantize the time series data as described above with reference to FIGS. 19A-19C, the quantile closest to each data point $x_k$ 1506 is determined by $$\underset{i=2,7}{\mathrm{argmin}} |x_k - q_i|$$

Figure 22D:
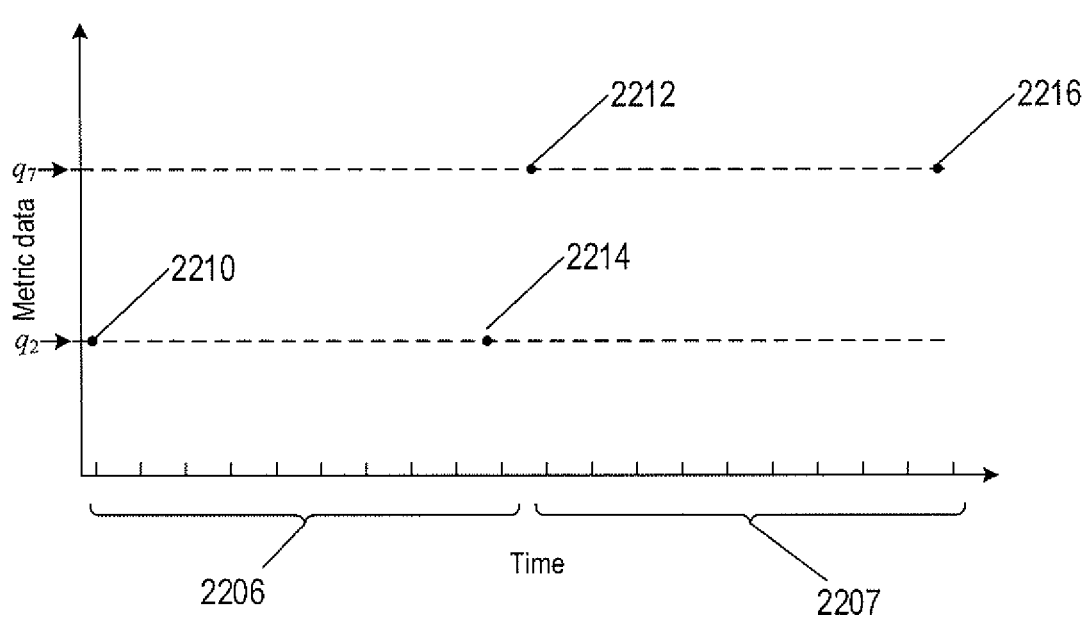

Dashed line 2202 is the distance $|x_k - q_7|$ between the data point 1506 and the quantile $q_7$ and dashed line 2204 is the distance $|x_k - q_2|$ between the data point 1506 and the quantile $q_2$. The quantized data point $x_k^q$ is assigned the quantile value $q_7$, because $|x_k - q_7| < |x_k - q_2|$. FIG. 22B shows directional arrows that represent quantization of the time series data to the closest of the two quantiles $q_2$ and $q_7$. FIG. 22C shows the quantized time series data that results from quantization to the two quantiles $q_2$ and $q_7$. The quantized time series data is represented by $x_k = q_2$ for time stamps 2206, and $x_k = q_7$ for time stamps 2208. Compression eliminates sequential repetitions in the quantized time series data. In one implementation, FIG. 22D shows how compression may be used to reduce a sequence of the quantized time series data that repeats the quantile $q_2$ for consecutive time stamps 2206 to a single value $x_1^c = q_2$ and reduce a sequence of the quantized time series that repeats the quantile $q_7$ for the consecutive time stamps 2207 to a single value $x_1^c = q_2$. Alternatively, compression may be used to reduce the sequence of the quantized time series that repeats the quantile $q_2$ for the consecutive time stamps 2206 to two data points $q_2$ and $x_{10}^c = q_2$ as represented in FIG. 22D by data points 2210 and 2214, respectively. Compression may be used to reduce the sequence of the quantized time series that repeats the quantile $q_7$ for the consecutive time stamps 2207 to two data points $x_{11}^c = q_7$ and $x_{20}^c = q_7$ as represented in FIG. 22D by data points 2212 and 2216, respectively. Any one of the loss functions given by Equations (5), (6), and (7) is used to compute a loss function value to obtain a measure of the amount of lost information in performing the quantization step. The compression rate calculated according to Equation (9) is 100((20−2)/20)=90%. Although the compression rate has not been reduced, the compresses time series data more closely matches the two clusters of data points in the original time series data and would have a lower loss function value than the loss function value for $x_k^q = q_5$, for k=1.

A loss function value and compression rate are computed for each combination of different pairs of the quantiles. The resulting set of loss function values and associated compression rates are subject to one of the selected optimization conditions given by Equation (12) or (13). The compressed time series data that correspond to the loss function value and compression rate that satisfies the selected condition is used to replace the original time series data in data storage.

Figure 23:
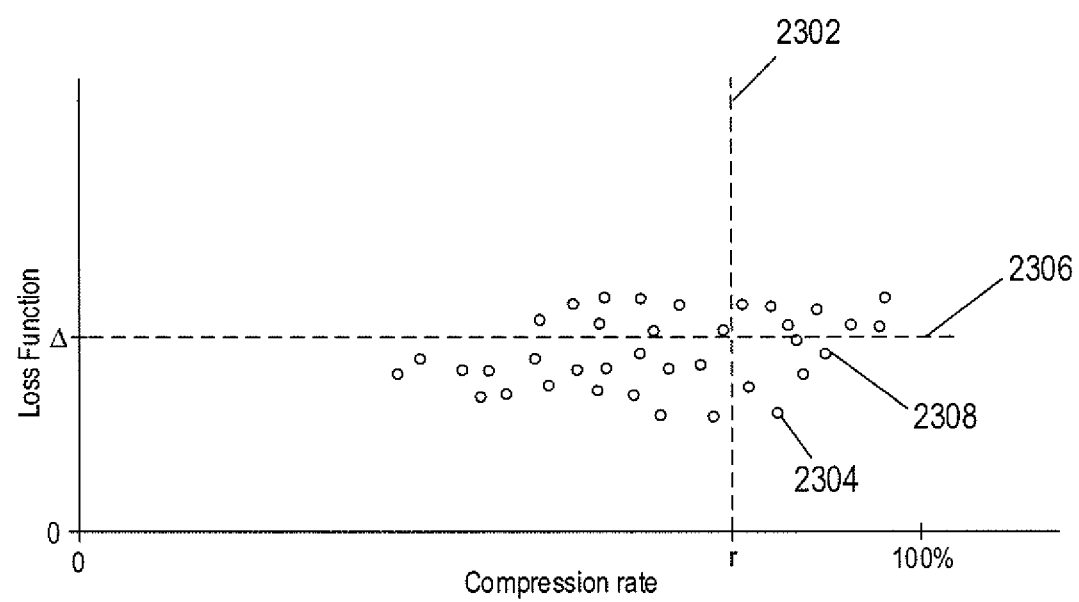
FIG. 23 shows a plot of example loss function values versus compression rates for 36 combinations of different pairs of quantiles.

FIG. 23 shows a plot of example loss function values versus compression rates for 36 combinations of different pairs of quantiles used to quantize and compress time series data. Each open point represents a loss function value and corresponding compression rate (CR, LF) computed for a pair of quantiles, as described above with reference to FIGS. 22A-22D. Suppose a user selected optimization of the loss function for a user selected lower bound r on the compression rate represented by dashed line 2302. According to the optimization condition in Equation (13), point 2304 has the minimum loss function value with a corresponding compression rate greater than the lower bound compression rate r. In this example, because the optimization condition in Equation (13) is satisfied, quantization and compression process stops and the compressed time series data associated with the point 2304 would be used to replace the original time series data. Suppose a user selected optimization of the compression rate for a selected upper bound $\Delta$ on loss function represented by dashed line 2306. According to the optimization condition in Equation (12), point 2308 has the maximum compression rate with a corresponding loss function values less than the upper bound $\Delta$. In this example, because the optimization condition in Equation (12) is satisfied, the quantization and compression process would also stop and the compressed time series data associated with the point 2308 would be used to replace the original time series data.

The example upper and lower bounds in FIG. 23 illustrate how the compressed time series data used to replace the original time series data may be different depending on which of the two optimization conditions are selected by the user. The compressed time series data associated with the point 2304 minimizes the amount of information lost due to quantization with a lower compression rate. While the compressed time series data associate with the point 2308 maximizes the amount of compressed data while giving up some loss in information content due to quantization.

If a user selected an upper bound $\Delta$ for the optimization condition of Equation (12) and the loss function values are greater than $\Delta$, then the method proceeds to a third iteration. If a user selected a lower bound r for the optimization condition of Equation (13), the method proceeds to the third iteration because the compression rate for the quantiles is less the r. In the third iteration, the combination index m is equal to 3 and the number of combinations of the nine quantiles is C(9,3)=84. In other words, quantization and compression are carried out for 84 combinations of three quantiles of the nine quantiles $q_1$, $q_2$, $q_3$, $q_4$, $q_5$, $q_6$, $q_7$, $q_8$, and $q_9$.

In other implementation, the number of quantiles considered in each iteration may be reduced by using the quantiles that are closest to satisfying the optimization condition from the previous iteration combined with another quantile. For example, suppose the quantiles $q_2$ and $q_7$ fail to satisfy the user selected optimization condition of Equation (12) or (13) but are closest to satisfying the select quantization condition. The third iteration may be carried out with the quantiles $q_2$ and $q_7$ combined separately with each of the remaining quantiles $q_1$, $q_3$, $q_4$, $q_5$, $q_6$, $q_8$, and $q_9$ until the selected optimization condition is satisfied.

Figure 24:
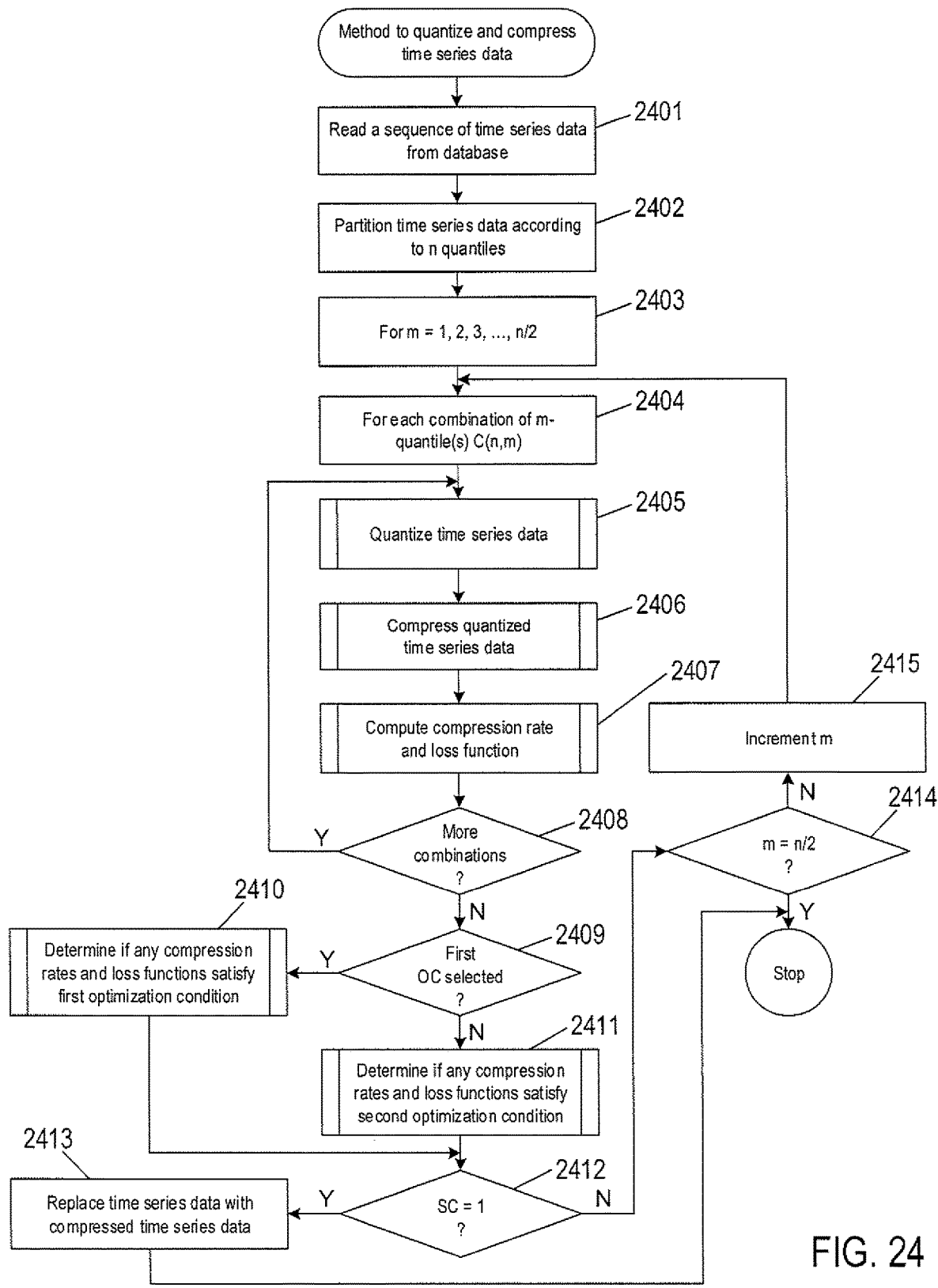
FIG. 24 shows a control-flow diagram of a method to quantize and compress time series data.

FIG. 24 shows a control-flow diagram of a method to quantize and compress time series data. In block 2401, a sequence of time series data is read from a database or data-storage device. In block 2402, the time series data is partitioned according to n quantiles as described above with reference to FIG. 16. A loop beginning with block 2403 repeats the computational operations represented by blocks 2404-2414 for each value of the combination index m described above with reference to Equation (14). A loop beginning with block 2404 repeats the computational operations represented by blocks 2405-2407 for each combination of in quantiles of the set of n quantiles. In block 2405, a routine "quantize time series data" is called. In block 2406, a routine "compressed quantized time series data" is called. In block 2407, a routine "compute compression rate and loss function" is called. In decision block 2408, when the combinations of m quantiles. have been exhausted, control flows to decision block 2409. In decision block 2409, if the user selected the optimization condition represented by Equation (13), control flows to block 2410. If the user selected the optimization condition represented by Equation (12), control flows to block 2411. In block 2410, a routine "determine if any compression rates and loss functions satisfy first optimization condition" is called. In block 2411, a routine "determine if any compression rates and loss functions satisfy second optimization condition" is called. Blocks 2410 and 2411 return a constant SC that can be "0" or "1." In decision block 2412, when the value of the constant SC returned from block 2410 or block 2411 equals "0," none of the combination rates and loss function values satisfies the conditions represented by Equations (12) or (13) and control flows to decision block 2414. Otherwise, when the value of the constant SC returned from block 2410 or block 2411 equals "1," a combination rate and loss function value that satisfies the conditions represented by Equations (12) or (13) has been determined and control flows to block 2413. In block 2413, the time series data is replaced with the compressed time series data associated with the compression rate and loss function value that satisfied the user selected optimization condition. In block 2414, when the number of combinations m is less than or equal to n/2, control flows to block 2415. In block 2415, the number of combinations index in is incremented.

Figure 25:
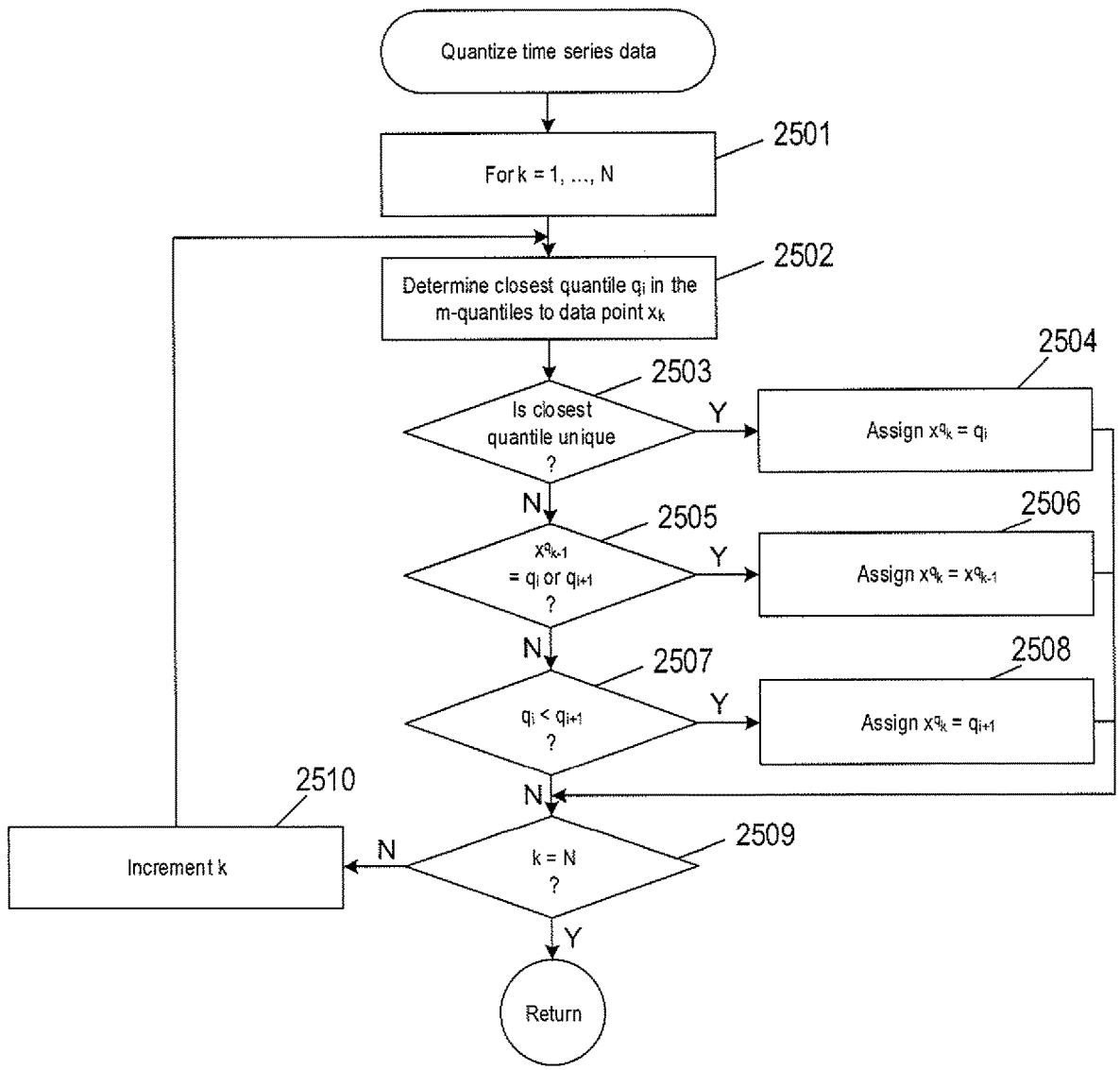
FIG. 25 shows a control-flow diagram of the routine "quantize time series data" called in FIG. 24.

FIG. 25 shows a control-flow diagram of the routine "quantize time series data" called in block 2405 of FIG. 24. A loop beginning with block 2501 repeats the computational operations represented by blocks 2502 and 2503 for each data point in the sequence of time series data. In block 2502, the closest quantile of the m quantiles to the data point $x_k$ is determined as described above with reference to Equation (3) is determined. In decision block 2503, if the closest quantile is unique (i.e., the data point $x_k$ is not midway between two quantiles $q_{i_0}$ and $q_{i_0+1}$ as described above with reference to Equation (3)), control flows to block 2504. In block 2504, the corresponding quantized data point $x_k^q$ is assigned the value of the closest quantile $q_{i_0}$ to the data point $x_k$ and added to the quantized time series data $X^q$, as described above with reference to FIGS. 19B and 22C. In decision block 2505, when the preceding quantized data point $x_{k-1}^q$ is equal to either of the two quantiles $q_{i_0}$ and $q_{i_0+1}$, control flows to block 2506. In block 2506, the quantized data point $x_k^q$ is assigned the value of the preceding quantized data point In decision block 2507, when $q_{i_0}$ is less than $q_{i_0+1}$, control flows to block 2508 and the quantized data point $x_k^q$ is assigned the larger value $q_{i_0+1}$. In decision block 2509, when k is not equal to N, control flows to block 2510 in which k is incremented.

Figure 26:
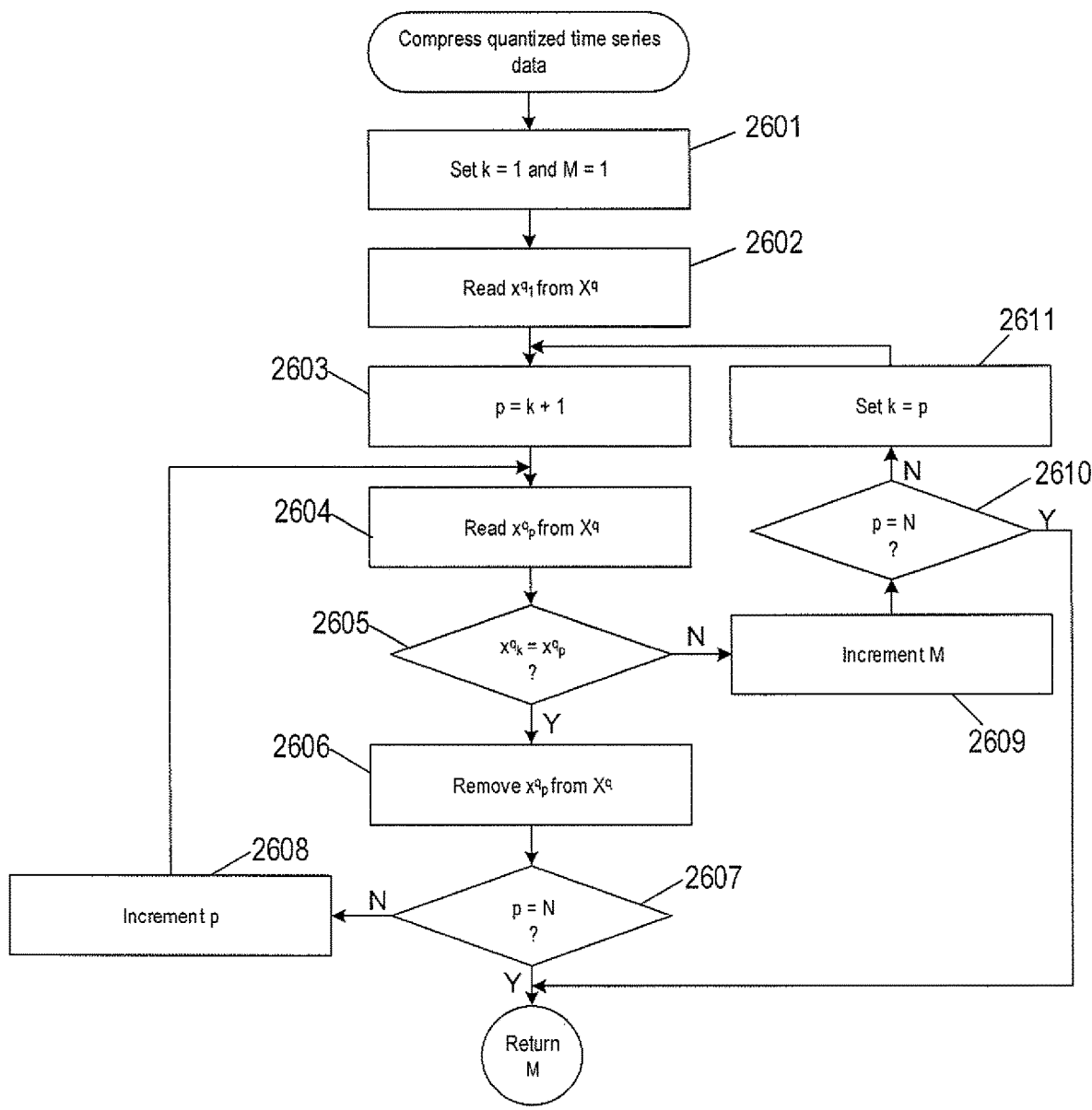
FIG. 26 shows a control-flow diagram of the routine "compress quantized time series data" called in FIG. 24.

FIG. 26 shows a control-flow diagram of the routine "compress quantized time series data" called in block 2406 of FIG. 24. In block 2601, the parameters k and M are initialized to "1." In block 2602, the quantized data point $x_k^q$ is read from the quantized time series data $X^q$. In block 2603, the parameter p is set equal to k+1. In block 2604, the quantized data point $x_k^q$ is read from the quantized time series data $X^q$. In decision block 2605, when the quantized data points $x_k^q$ and $x_p^q$, control flows to block 2606. Otherwise, control flows block 2609. In block 2606, the quantized data point $x_p^q$ is removed from the quantized time series data $X^q$. In decision block 2607, when p is less than N control flows to block 2608 in which p is incremented. In block 2609, the parameter M is incremented. In decision block 2610, when p is less than N control flows to block 2611 in which k is assigned the value of p.

Figure 27:
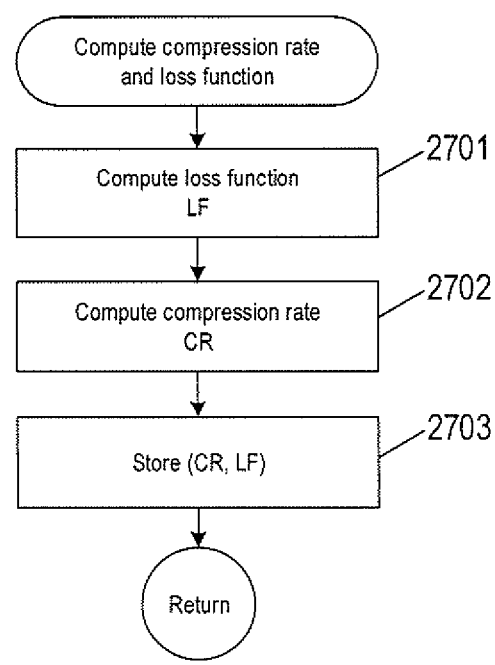
FIG. 27 shows a control-flow diagram of the routine "compute compression rate and loss function" called in FIG. 24.

FIG. 27 shows a control-flow diagram of the routine "compute compression rate and loss function" called in block 2407 of FIG. 24. In block 2701, the loss function LF is computed for the quantized time series data using any one of the loss functions described above with reference to Equations (5), (6), and (7). In block 2702, the compression rate CR is computed using the value of the parameter M determined in the compression routine of block 2406 as described above with reference to Equation (9). In block 2703, the compression rate and loss function value, (CR, LF), for the compressed time series data obtained in block 2406 of FIG. 24 is stored in a data-storage device.

Figure 28:
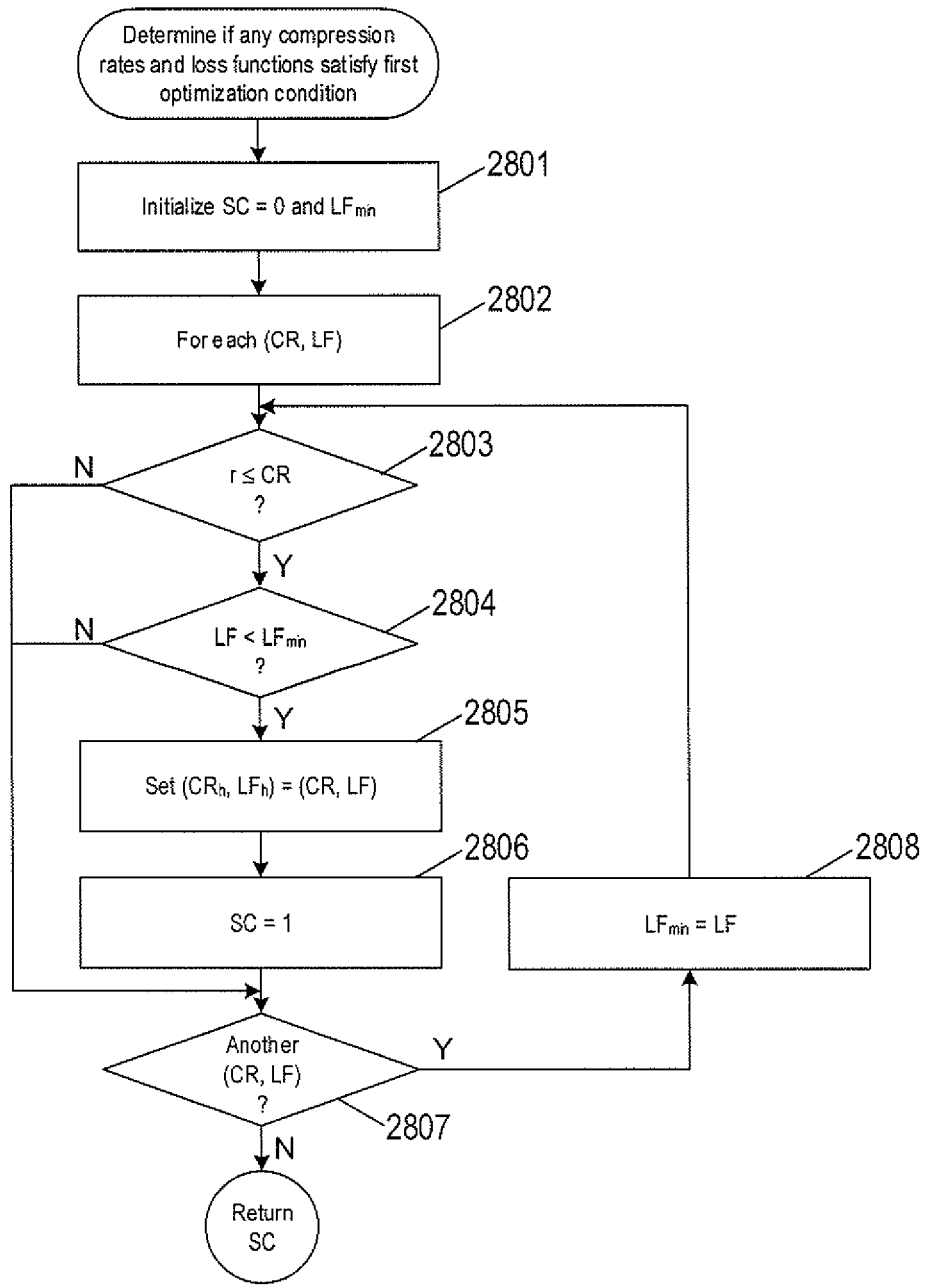
FIG. 28 shows a control-flow diagram of the routine "determine if any compression rates and loss functions satisfy first optimization condition" called in FIG. 24.

FIG. 28 shows a control-flow diagram of the routine "determine if any compression rates and loss functions satisfy first optimization condition" called in block 2410 of FIG. 24. In block 2801, the parameter SC is initialized "0" and the minimum loss function value $LF_{min}$ is initialized. The initial value of zero for the parameter SC indicates that no compression rate and loss function value satisfies the optimization condition represented by Equation (13). A loop beginning with block 2802 repeats the computational operations represented by blocks 2803-2806 for each compression rate and loss function value (CR, LF) associated with a sequence of compressed time series data in $X^c$. In decision block 2803, when the compression rate CR is greater than a user selected lower bound r for the compression rate, control flows to decision block 2804. In decision block 2804, when the loss function value LF is greater than a user selected lower bound r for the compression rate, control flows to block 2805. In block 2805, the compression rate and loss function value that satisfies the conditions in blocks 2803 and 2804 is stored as $(CR_h, LF_h)$. In block 2806, the parameter SC is set equal to "1," which indicates that a compression rate and loss function value that satisfies the optimization condition represented by Equation (13) has been found. In decision block 2807, if other compression rates and loss function values (CR, LF) are have not processed, control flows to block 2808, in order to determine if there exists another compression rate and loss function value that minimizes the loss function. In block 2808, the minimum loss function value $LF_{min}$ is set to the current loss function value LF.

Figure 29:
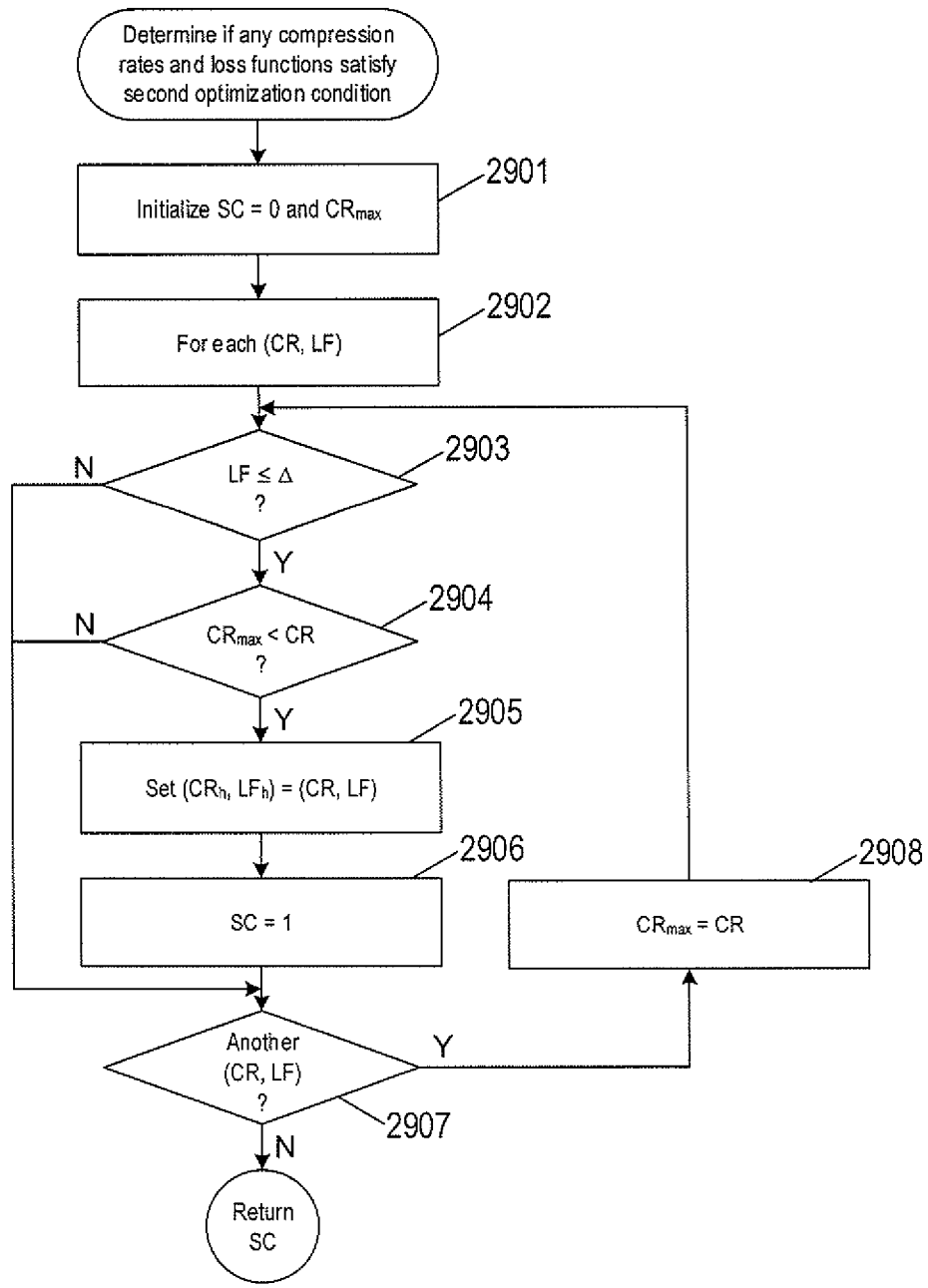
FIG. 29 shows a control-flow diagram of the routine "determine if any compression rates and loss functions satisfy second optimization condition" called in FIG. 24.

FIG. 29 shows a control-flow diagram of the routine "determine if any compression rates and loss functions satisfy second optimization condition" called in block 2411 of FIG. 24. In block 2901, the parameter SC is initialized "0" and the maximum compression rate $CR_{max}$ is initialized. The initial value of zero for the parameter SC indicates that no compression rate and loss function value satisfies the optimization condition represented by Equation (12). A loop beginning with block 2902 repeats the computational operations represented by blocks 2903-2906 for each compression rate and loss function value (CR, LF) associated with a sequence of compressed time series data in X'. In decision block 2903, when the loss function value LF is less than or equal to a user selected upper bound Δ for the loss function, control flows to decision block 2904. In decision block 2904, when the compression rate CR is greater than maximum compression rate $CR_{max}$, control flows to block 2905. In block 2905, the compression rate and loss function value that satisfies the conditions in blocks 2903 and 2904 is stored as $(CR_h, LF_h)$. In block 2906, the parameter SC is set equal to "1," which indicates that a compression rate and loss function value that satisfies the optimization condition represented by Equation (12) has been found. In decision block 2907, if other compression rates and loss function values (CR, LF) are have not processed, control flows to block 2908, in order to determine if there exists another compression rate and loss function value that minimizes the loss function. In block 2908, the maximum compression rate $CR_{max}$ is set to the current compression rate CR.

In other implementation, the operations represented by blocks 2405-2407 may be carried using the quantiles that are closest to satisfying the optimization condition from the previous iteration combined with another quantile. For example, suppose that after the first iteration, the quantiles $q_i$ is closest to satisfying the selected optimization condition of Equation (12) or (13). A second iteration may be carried out for different combinations of the quantile $q_i$ and the quantiles $q_j$, where j=1, ..., n. If a combination of quantiles $q_i$ and $q_j$ are determined are closest but still do not satisfy the optimization condition of Equation (12) or (13), a third iteration is carried out with the combination of quantiles $q_i$, $q_j$, and $q_l$, where l=1, ..., n. The process of using the quantiles from a previous iteration continues until the selected optimization condition is satisfied as described above with reference to 28 and 29.

The method of FIGS. 24-29 automates the task of quantizing and compressing time series data stored in data-storage devices of a distributed computing system. The compressed time series data used to replace the original time series data in block 2413 of FIG. 24 occupies far less storage space than the original time series data, freeing storage space in the data-storage device. The time series data may be replaced by deleting the time series data from the data-storage device and writing the compressed time series data to the data-storage device. Alternatively, the time series data may be overwritten by the compressed time series data. The smaller set of compressed time series data also enables faster and more timely analysis by a management server. For example, the management server can process the compressed time series data in real time or near real time to search for anomalous behavior of a resource or object, identify problems with the resource, and characterize the compressed time series data. For example, an anomaly or problem may be identified when compressed data points violate a threshold. When an anomaly or problem is detected, the management server may generate an alert identifying the anomaly or problem, and because there is no significant delay, a system administrator is better able to respond accordingly.

Figure 30A:
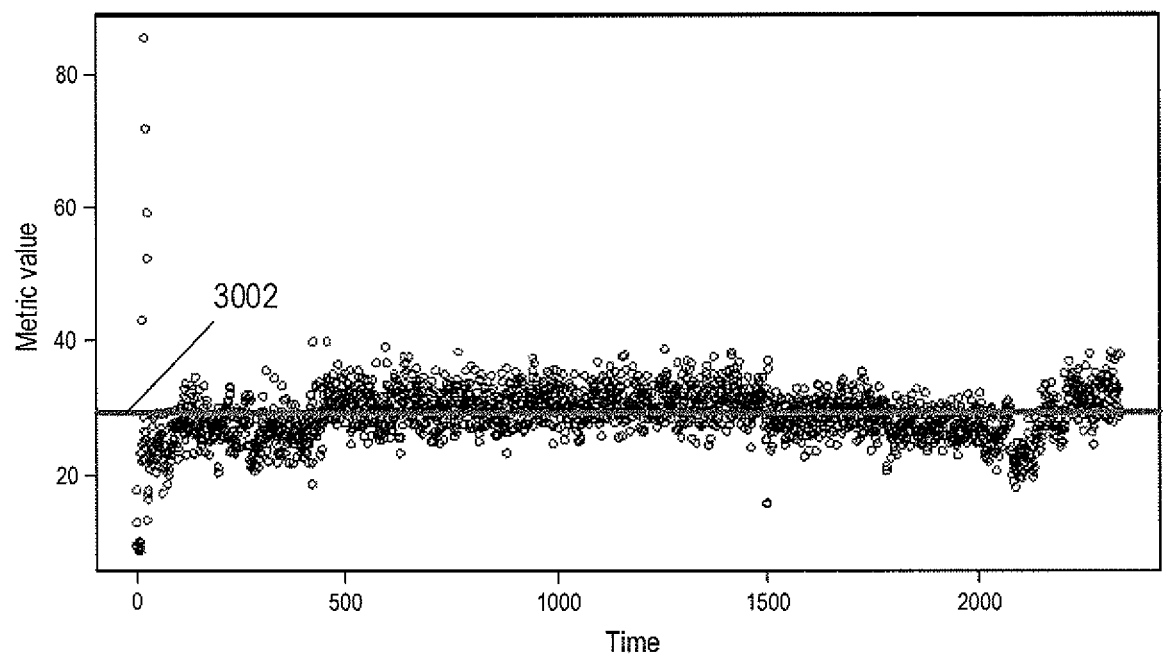
FIGS. 30A-35B show examples of quantization and compression applied to actual high-variability and low-variability sets of time series data.
Figure 30B:
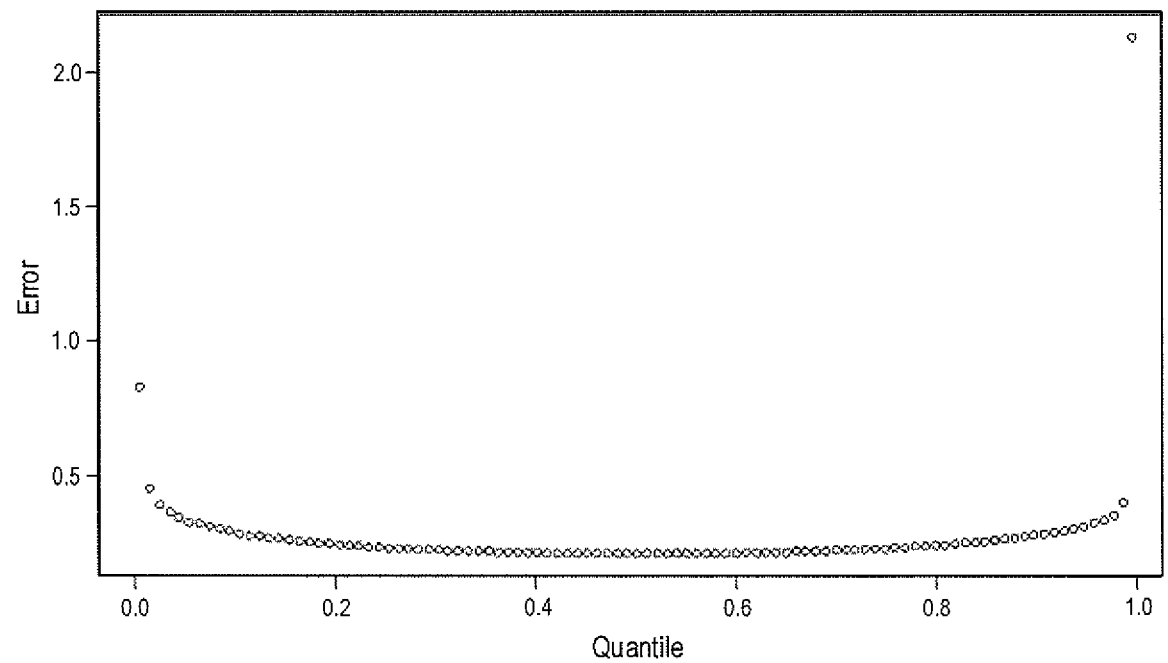
Figure 30C:
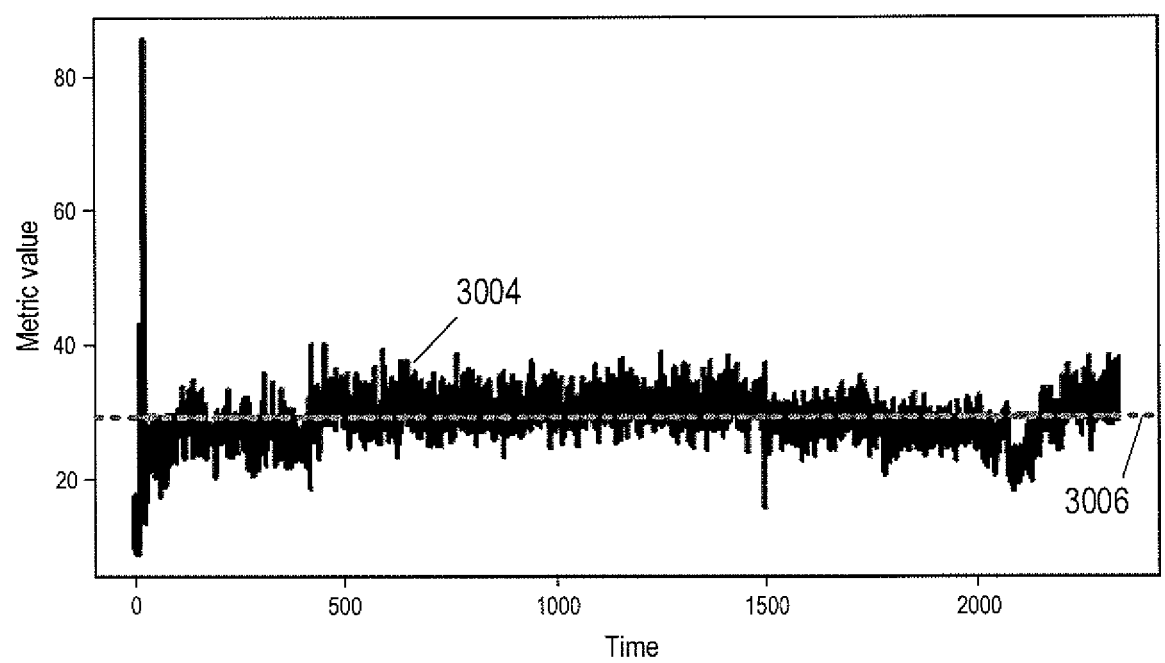

FIGS. 30A-35B show examples of quantization and compression applied to actual high-variability and low-variability sets of time series data. FIG. 30A shows a plot of a high-variability set of time series data comprising 2340 data points. The minimum data value is min(data)=8.9. The maximum data value is max(data)=85.9. A set of 100 quantiles was applied to the time series data as described above with reference to Equation (3). FIG. 30B shows a plot of error values versus quantiles for the time series data shown in FIG. 30A. The error values were computed for each of the 100 quantiles using Equation (5) and are given by $l_1$/mean(data). Line 3002 in FIG. 30A represents the quantile value of 29.3, which is the median value of the time series data and corresponds to the 0.5-th quantile. The compression rate of CR=100% is the same for each quantile of the 100 quantiles. FIG. 30C shows the original time series data of FIG. 30A represented by a gagged curve 3004 and the quantized time series data for quantile value of 29.3 represented by dashed line 3006.

Figure 31A:
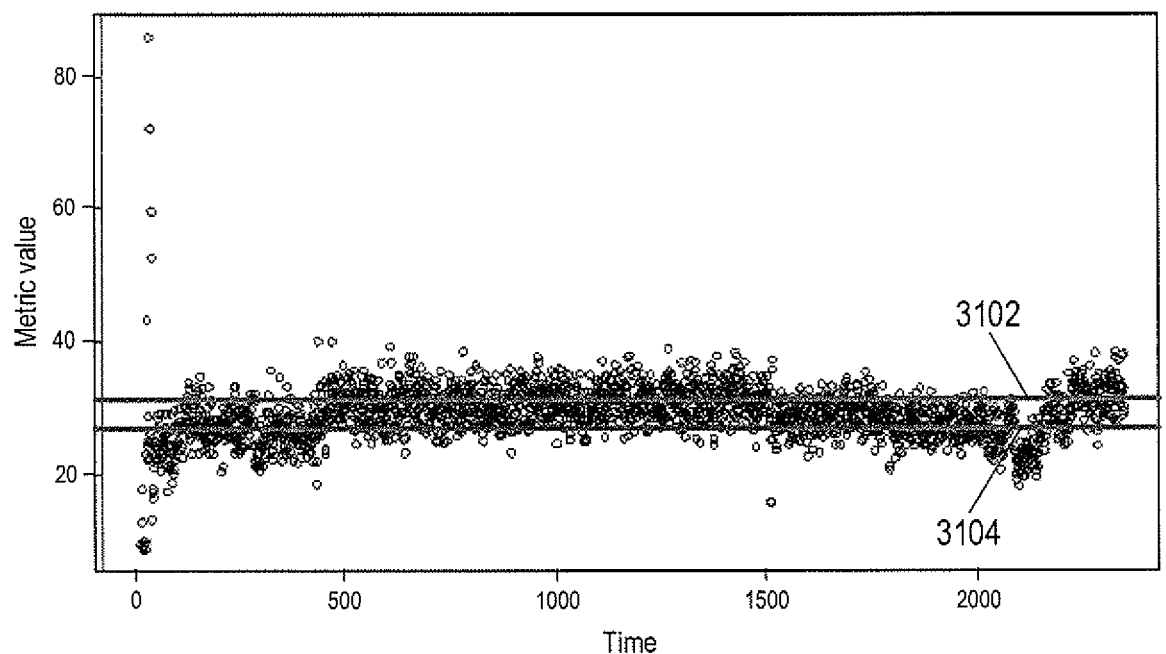
Figure 31B:
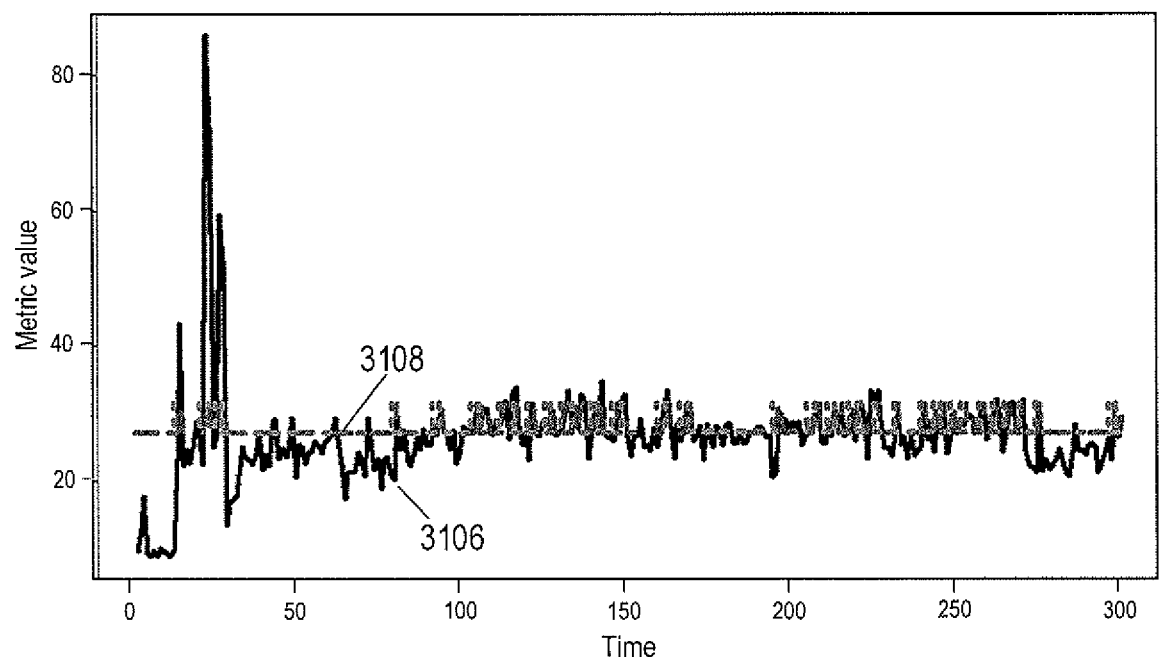
Figure 31C:
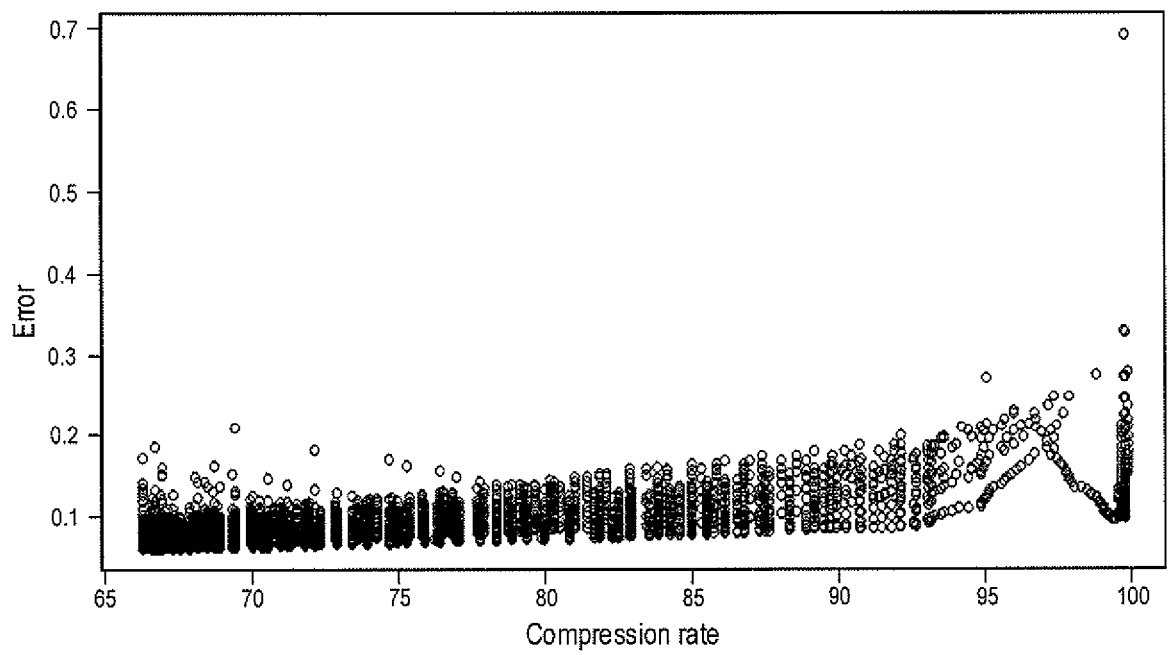
Figure 31D:
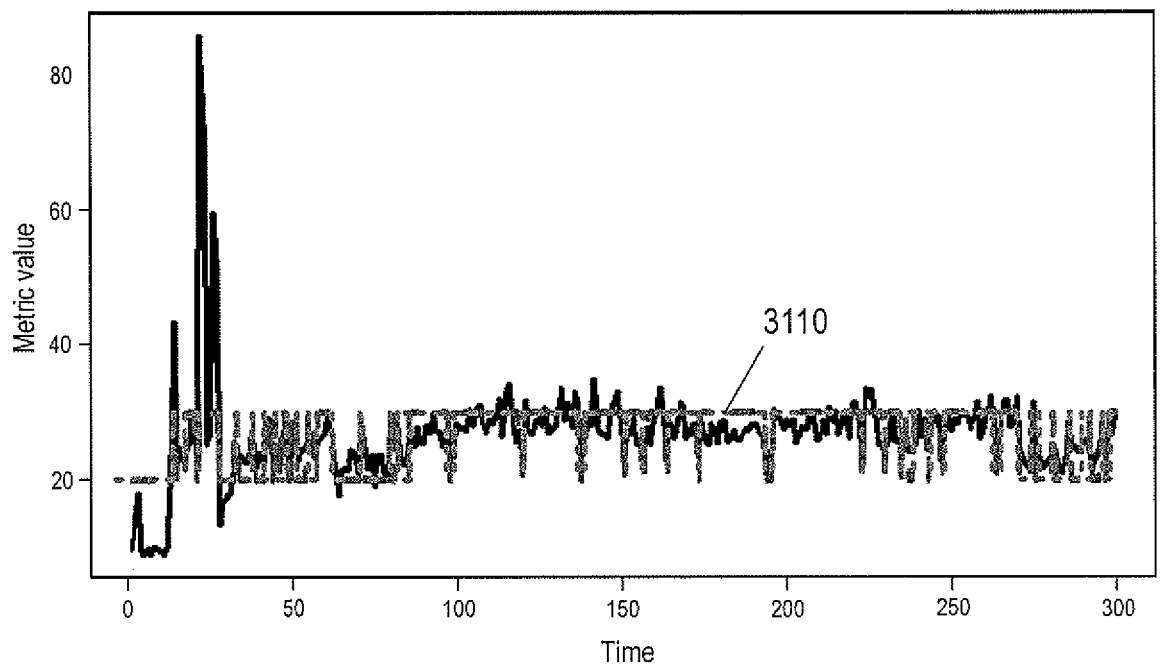

FIG. 31A shows a plot of the time series data with two quantiles of the 100 represented by lines 3102 and 3104. Line 3102 corresponds to the 75-th quantile with a value of 31.53. Line 3104 corresponds to the 25-th quantile with a value of 27. FIG. 31B shows the time series data represented by gagged curve 3106. Dashed line curve 3108 represents the quantized time series data for the 25-th and 75-th quantiles. The corresponding compression rate is 66.6% and the error is $l_1$/mean(data)=0.0608. The compression rate was increased by increasing the error. A lower bound of 90% was placed on the compression rate. FIG. 31C shows a plot of error (i.e., loss function/mean(data)) versus compression rate for 10,201 pairs of the 100 quantiles applied to the time series data. The two quantiles of 19.7 and 29.7 of the 100 quantiles gave a minimum error of 0.086 and a compression rate of 90.7%. The quantized time series data obtained with the quantiles 19.7 and 29.7 are represented in FIG. 31D by dashed curve 3110.

Figure 32A:
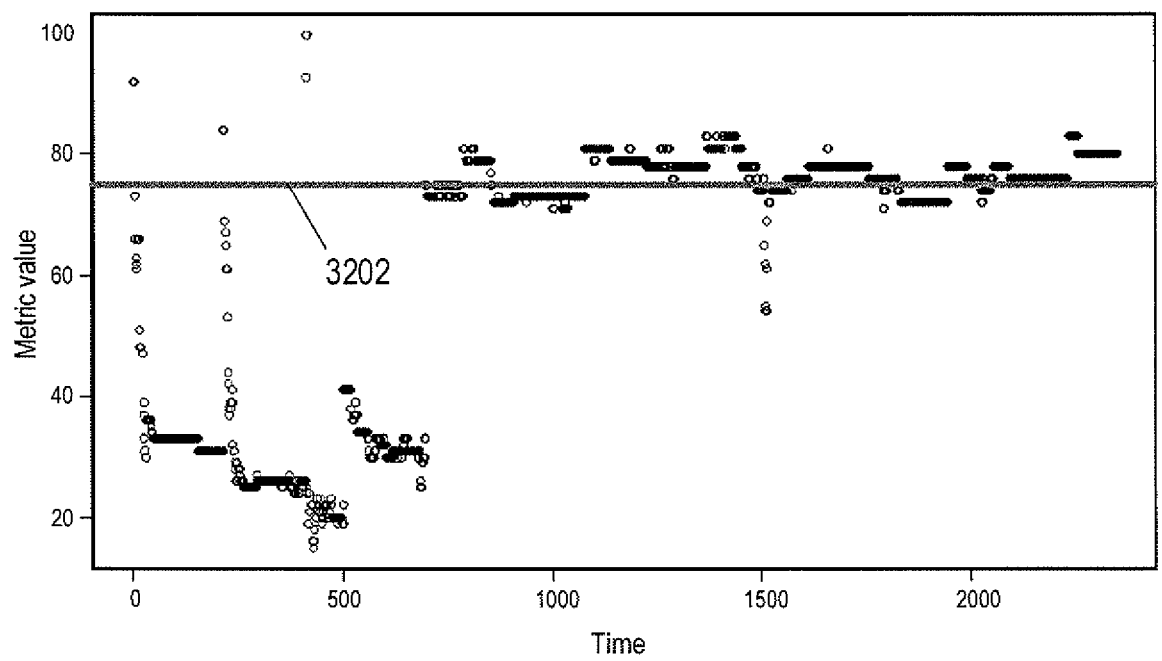
Figure 32B:
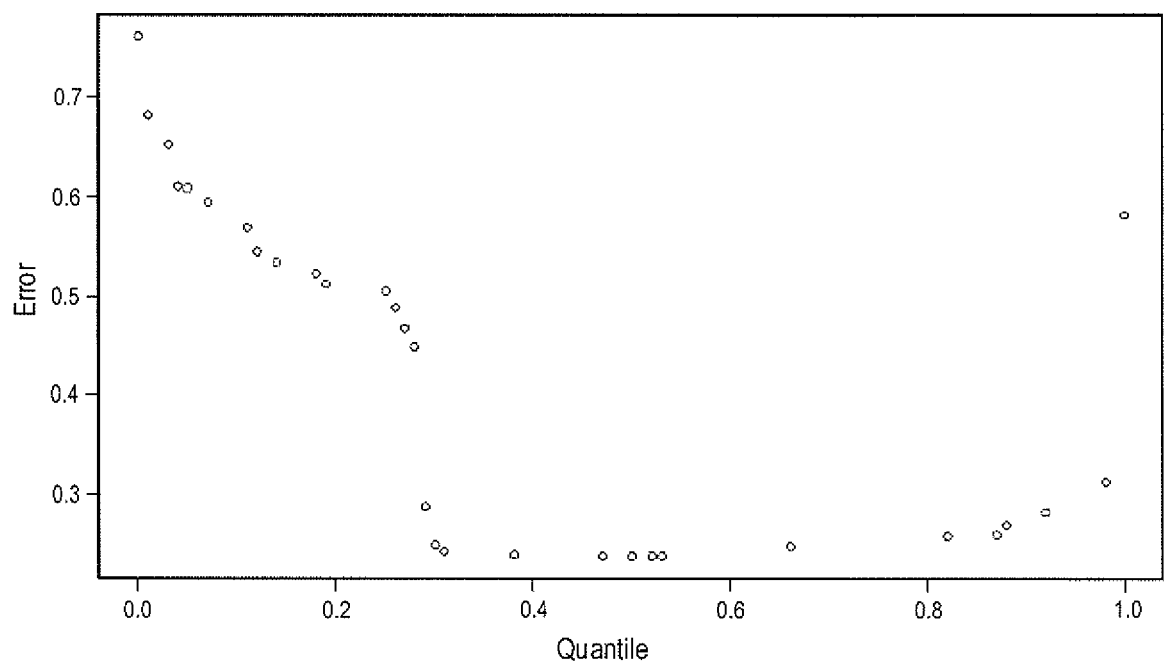

FIG. 32A shows a plot of low-variability time series data comprising 2346 data points. FIG. 32B shows a plot of error versus 30 quantiles applied to the time series data. Each dot represents an error value computed for one of 30 quantiles. Line 3202 in FIG. 32A is the 0.5-th quantile equal to 75, which gave a minimum error of $l_1$/mean(data)=0.24.

Figure 33A:
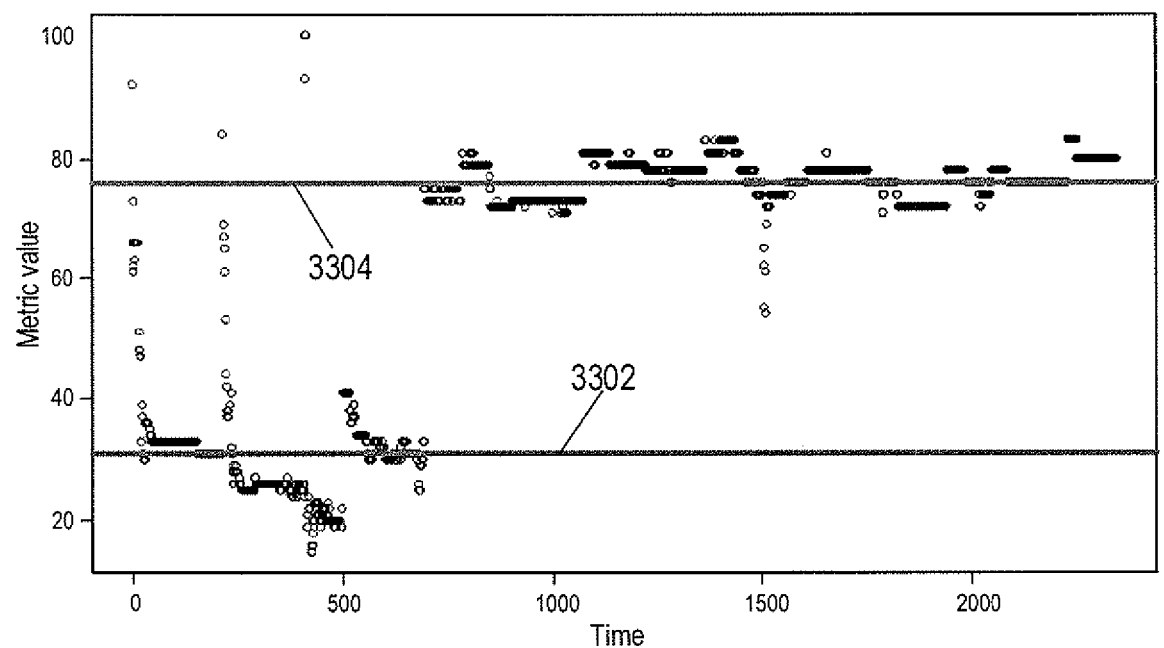
Figure 33B:
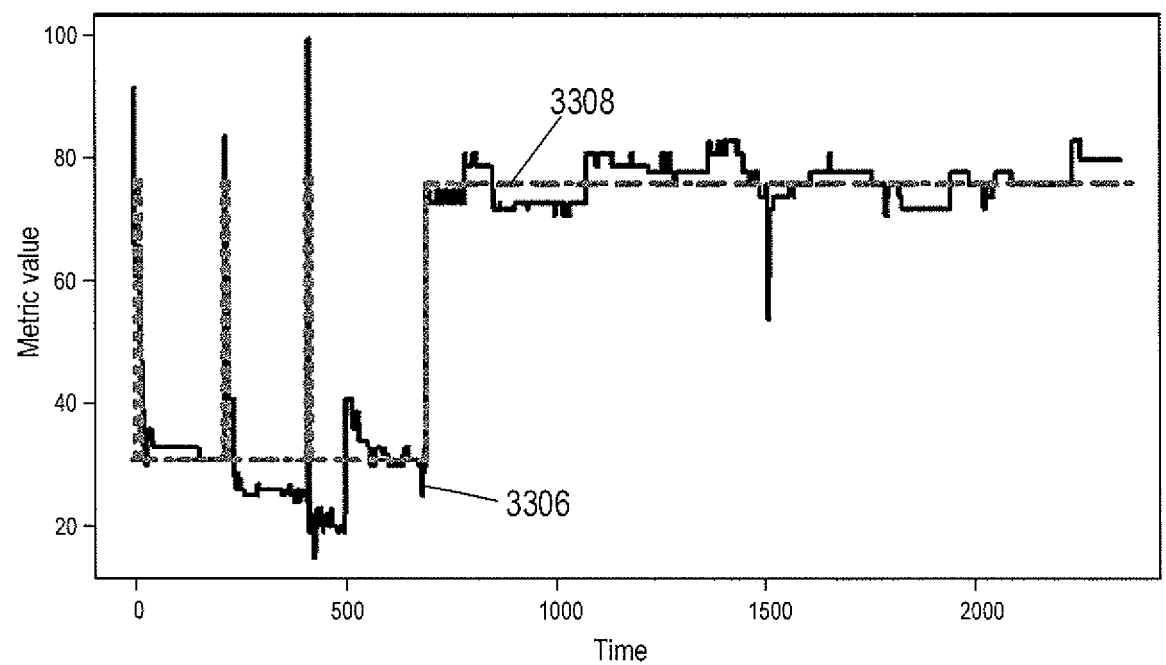

FIG. 33A shows a plot of the time series data with two of the 30 quantiles represented by lines 3302 and 3304. The quantile 3302 is 31 (0.14-th quantile) and the quantile 3304 is 76 (0.53-th quantile). These two quantiles gave minimize error of $l_1$/mean(data)=0.051 and a compression rate of 99.7%. FIG. 33B shows the time series data represented gagged curve 3306 and the quantized time series data obtained from the quantiles 3302 and 3304 represented by dashed curve 3308.

Figure 34A:
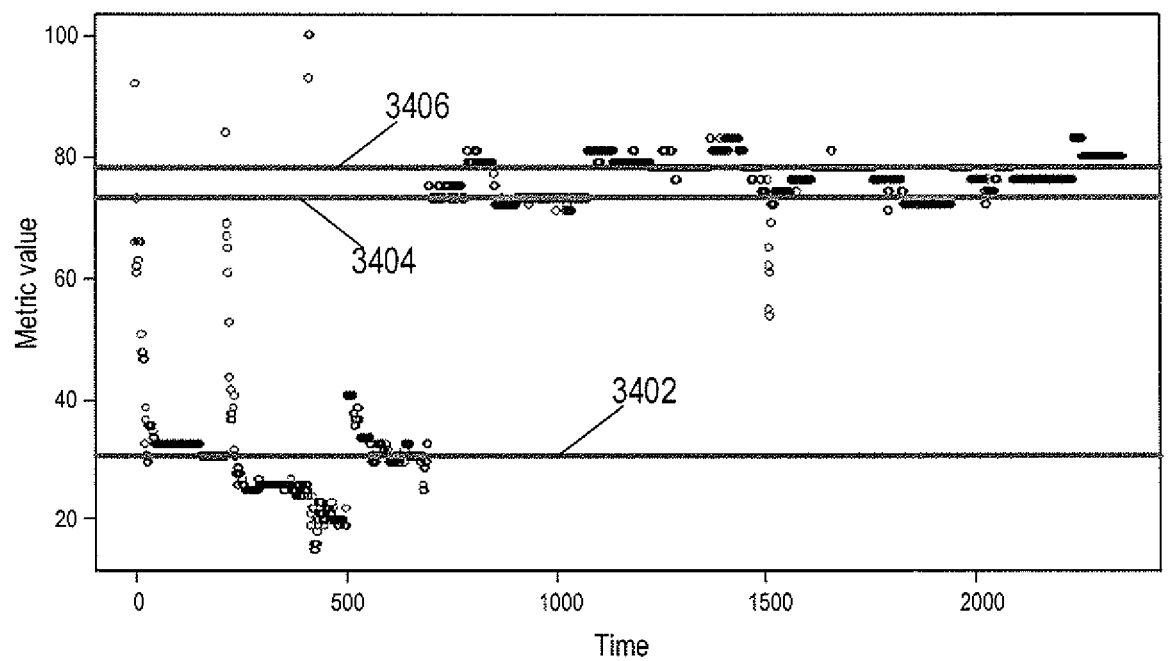
Figure 34B:
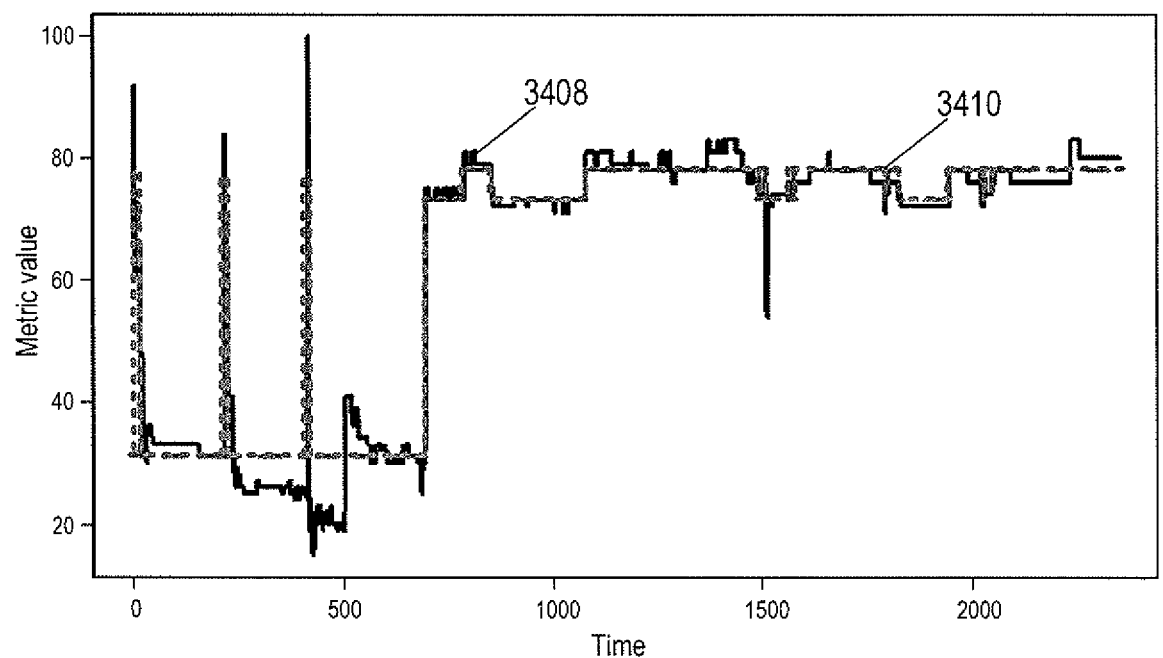

FIG. 34A shows a plot of the time series data with three of the 30 quantiles represented by lines 3402, 3404, and 3406. The quantile 3402 is 31 (0.14-th quantile), the quantile 3404 is 73 (0.38-th quantile), and the quantile 3406 is 78 (0.66-th quantile). These three quantiles gave a minimize error of $l_1$/mean(data)=0.036 and a compression rate of 98.9%. FIG. 33B shows the time series data represented by gagged curve 3408 and the quantized time series data obtained from the quantiles 3402, 3404, and 3406 represented by dashed curve 3410.

Figure 35A:
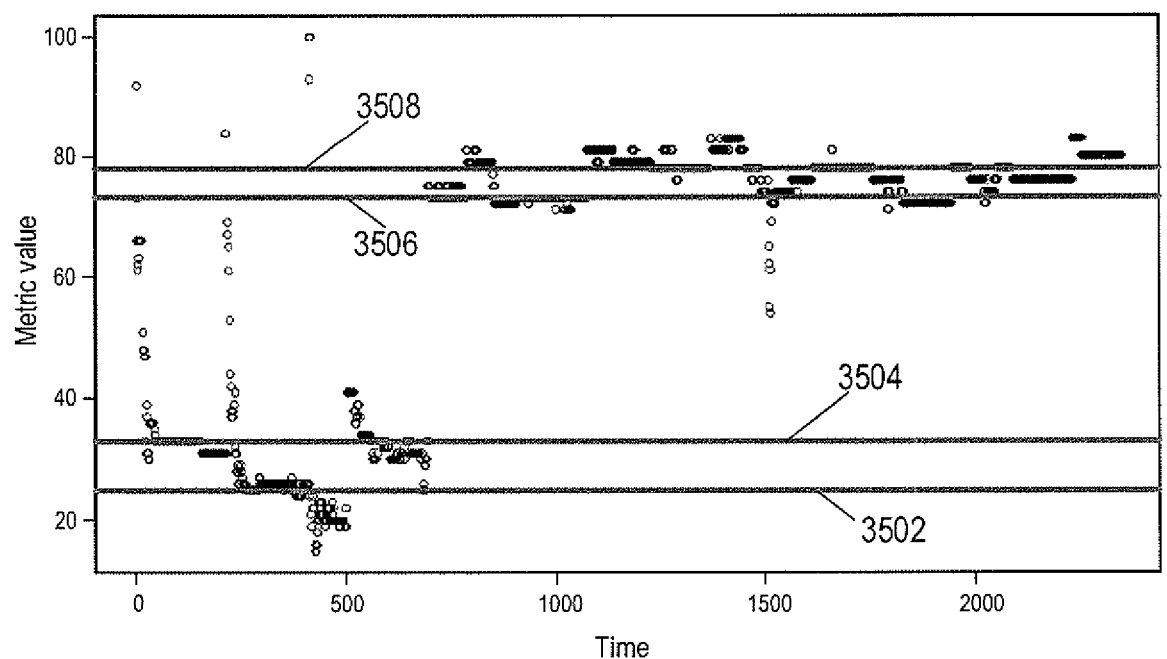
Figure 35B:
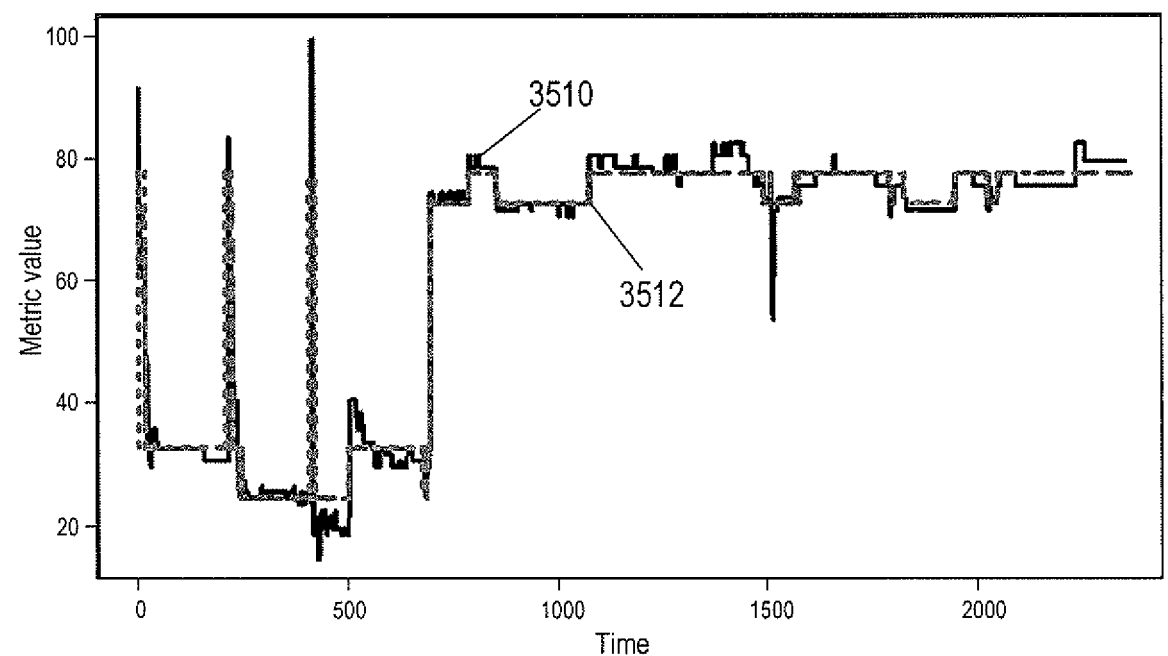

FIG. 35A shows a plot of the time series data with four of the 30 quantiles represented by lines 3502, 3504, 3506, and 3508. The quantile 3502 is 25 (0.06-th quantile), the quantile 3504 is 33 (0.2-th quantile), the quantile 3504 is 73 (038-th quantile), and the quantile 3508 is 78 (0.66-th quantile). These four quantiles gave a minimize error of $l_1$/mean(data) =0.026 and a compression rate of 98.6%. FIG. 35B shows the time series data represented by gagged curve 3510 and the quantized time series data obtained from the quantiles 3502, 3504, 3506, and 3508 represented by dashed curve 3510.

The results of FIG. 30-35 indicate that, in general, for low-variability data increasing the number of quantiles to quantize the time series data decrease the error without significant impact on the compression rate. The same is not true for high-variability data.

It is appreciated that the previous description of the disclosed embodiments is provided to enable any person skilled in the art to make or use the present disclosure. Various modifications to these embodiments will be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method stored in one or more data-storage devices and executed using one or more processors of a management server computer to quantize and compress time series data generated by an object of a distributed computing system, the method comprising:
   partitioning the time series data stored in a data-storage device into groups of time series data for a set of quantiles that divides a range of values of the time series data such that each group contains a subset of the time series data;
   for each different combination of one or more quantiles of the set of quantiles
      computing quantized time series data from the time series data and the combination of one or more quantiles,
      compressing the quantized time series data to generate compressed time series data,
      computing a loss function value based on the quantized time series data and the time series data, the loss function value representing an amount of information lost in computing the quantized time series data, and
      computing a compression rate based on a count of data points in the time series data and a count of data points in the compressed time series data; and
   replacing the time series data in the data-storage device with the compressed time series data when an associated loss function value and compression rate satisfy an optimization condition.

2. The method of claim 1 wherein computing the quantized time series data comprises:
   for each data point of the time series data,
      determining a closest quantile of the combination of one or more quantiles to the data point; and
      assigning a value of the closest quantile to the data point to a corresponding quantized data point in the quantized time series data.

3. The method of claim 1 wherein compressing the quantized time series data comprises:
   determining each sequence of repeated quantized data points of the quantized time series data;
   deleting repeated quantized data points in each sequence of repeated quantized data points, leaving one quantized data point from each sequence.

4. The method of claim 1 wherein computing the loss function value comprises computing a distance between the quantized time series data and the time series data.

5. The method of claim 1 wherein computing the compression rate comprises computing the compression rate based on a difference between the count of data points in the time series data and the count of data points in the compressed time series data divided by the count of data points in the time series data.

6. The method of claim 1 wherein replacing the time series data in the data-storage device with the compressed time series data when an associated loss function value and compression rate satisfy an optimization condition comprises replacing the time series data in the data-storage device with the compress time series data when the compress rate is at a maximum for an upper bound on the loss function value.

7. The method of claim 1 wherein replacing the time series data in the data-storage device with the compressed time series data when an associated loss function value and compression rate satisfy an optimization condition comprises replacing the time series data in the data-storage device with the compress time series data when the loss function value is at a minimum for a lower bound on the loss function value.

8. The method of claim 1 further comprises when the associated loss function value and compression rate fail to satisfy the optimization condition each combination of the same number of one or more quantiles repeating computing quantized time series data, compressing the quantized time series data, computing a loss function value, and computing a compression rate for each combination of a different number of one or more quantiles.

9. The method of claim 1 further comprising analyzing the compressed time series data stored in the data-storage device to determine an anomaly or problem with an object that generated the time series data.

10. A system to quantize and compress time series data generated by an object of a distributed computing system, the system comprising:
one or more processors;
one or more data-storage devices; and
machine-readable instructions stored in the one or more data-storage devices that when executed using the one or more processors controls the system to perform operations comprising:
partitioning the time series data stored in a data-storage device into groups of time series data for a set of quantiles that divides a range of values of the time series data such that each group contains a subset of the time series data;
for each different combination of one or more quantiles of the set of quantiles
computing quantized time series data from the time series data and the combination of quantiles,
compressing the quantized time series data to generate compressed time series data,
computing a loss function value based on the quantized time series data and the time series data, the loss function value representing an amount of information lost in computing the quantized time series data, and
computing a compression rate based on a count of data points in the time series data and a count of data points in the compressed time series data; and
replacing the time series data in the one or more data-storage device with the compressed time series data when an associated loss function value and compression rate satisfy an optimization condition.

11. The system of claim 10 wherein computing the quantized time series data comprises:
for each data point of the time series data,
determining a closest quantile of the combination of one or more quantiles to the data point; and
assigning a value of the closest quantile to the data point to a corresponding quantized data point in the quantized time series data.

12. The system of claim 10 wherein compressing the quantized time series data comprises:
determining each sequence of repeated quantized data points of the quantized time series data;
deleting repeated quantized data points in each sequence of repeated quantized data points, leaving one quantized data point from each sequence.

13. The system of claim 10 wherein computing the loss function value comprises computing a distance between the quantized time series data and the time series data.

14. The system of claim 10 wherein computing the compression rate comprises computing the compression rate based on a difference between the count of data points in the time series data and the count of data points in the compressed time series data divided by the count of data points in the time series data.

15. The system of claim 10 wherein replacing the time series data in the data-storage device with the compressed time series data when an associated loss function value and compression rate satisfy an optimization condition comprises replacing the time series data in the data-storage device with the compress time series data when the compress rate is at a maximum for an upper bound on the loss function value.

16. The system of claim 10 wherein replacing the time series data in the data-storage device with the compressed time series data when an associated loss function value and compression rate satisfy an optimization condition comprises replacing the time series data in the data-storage device with the compress time series data when the loss function value is at a minimum for a lower bound on the loss function value.

17. The system of claim 10 further comprises when the associated loss function value and compression rate fail to satisfy the optimization condition each combination of the same number of one or more quantiles repeating computing quantized time series data, compressing the quantized time series data, computing a loss function value, and computing a compression rate for each combination of a different number of one or more quantiles.

18. The system of claim 10 further comprising analyzing the compressed time series data stored in the data-storage device to determine an anomaly or problem with an object that generated the time series data.

19. A non-transitory computer-readable medium encoded with machine-readable instructions that implement a method carried out by one or more processors of a computer system to perform operations comprising:
partitioning the time series data stored in a data-storage device into groups of time series data for a set of quantiles that divides a range of values of the time series data such that each group contains a subset of the time series data;
for each different combination of one or more quantiles of the set of quantiles
computing quantized time series data from the time series data and the combination of one or more quantiles,
compressing the quantized time series data to generate compressed time series data,
computing a loss function value based on the quantized time series data and the time series data, the loss function value representing an amount of information lost in computing the quantized time series data, and computing a compression rate based on a count of data points in the time series data and a count of data points in the compressed time series data; and replacing the time series data in the data-storage device with the compressed time series data when an associated loss function value and compression rate satisfy an optimization condition.

20. The medium of claim 19 wherein computing the quantized time series data comprises:

for each data point of the time series data, determining a closest quantile of the combination of one or more quantiles to the data point; and assigning a value of the closest quantile to the data point to a corresponding quantized data point in the quantized time series data.

21. The medium of claim 19 wherein compressing the quantized time series data comprises:

determining each sequence of repeated quantized data points of the quantized time series data;

deleting repeated quantized data points in each sequence of repeated quantized data points, leaving one quantized data point from each sequence.

22. The medium of claim 19 wherein computing the loss function value comprises computing a distance between the quantized time series data and the time series data.

23. The medium of claim 19 wherein computing the compression rate comprises computing the compression rate based on a difference between the count of data points in the time series data and the count of data points in the compressed time series data divided by the count of data points in the time series data.

24. The medium of claim 19 wherein replacing the time series data in the data-storage device with the compressed time series data when an associated loss function value and compression rate satisfy an optimization condition comprises replacing the time series data in the data-storage device with the compress time series data when the compress rate is at a maximum for an upper bound on the loss function value.

25. The medium of claim 19 wherein replacing the time series data in the data-storage device with the compressed time series data when an associated loss function value and compression rate satisfy an optimization condition comprises replacing the time series data in the data-storage device with the compress time series data when the loss function value is at a minimum for a lower bound on the loss function value.

26. The medium of claim 19 further comprises when the associated loss function value and compression rate fail to satisfy the optimization condition each combination of the same number of one or more quantiles repeating computing quantized time series data, compressing the quantized time series data, computing a loss function value, and computing a compression rate for each combination of a different number of one or more quantiles.

27. The medium of claim 19 further comprising analyzing the compressed time series data stored in the data-storage device to determine an anomaly or problem with an object that generated the time series data.

* * * * *